US010672305B2

(12) United States Patent
Struhl et al.

(10) Patent No.: US 10,672,305 B2
(45) Date of Patent: Jun. 2, 2020

(54) REPLACEABLE WHEEL OR FOOT ASSEMBLY AND LEG SYSTEM FOR A SIGN DISPLAY STAND

(71) Applicants: Clifford Struhl, Syosset, NY (US); Raymond M. Schneider, Port Washington, NY (US)

(72) Inventors: Clifford Struhl, Syosset, NY (US); Raymond M. Schneider, Port Washington, NY (US)

(73) Assignee: Clifford Struhl, Syosset, NY (US)

( * ) Notice: Subject to any disclaimer, the term of this patent is extended or adjusted under 35 U.S.C. 154(b) by 151 days.

(21) Appl. No.: 15/642,926

(22) Filed: Jul. 6, 2017

(65) Prior Publication Data
US 2018/0012527 A1     Jan. 11, 2018

Related U.S. Application Data

(60) Provisional application No. 62/360,617, filed on Jul. 11, 2016.

(51) Int. Cl.
| G09F 15/00 | (2006.01) |
| B60B 33/00 | (2006.01) |
| F16M 11/42 | (2006.01) |

(52) U.S. Cl.
CPC ........ G09F 15/0056 (2013.01); B60B 33/001 (2013.01); F16M 11/42 (2013.01); G09F 15/0062 (2013.01)

(58) Field of Classification Search
CPC ....... F16M 11/42; Y10T 16/19; Y10T 16/191; Y10T 16/203; Y10T 16/205; B60B 33/0005; B60B 33/0007; B60B 33/001; B60B 33/0015; B60B 33/0023; G09F 15/0056; G09F 15/0062
USPC ..... 248/129; 16/29, 30, 31 R, 40; 190/18 A; 40/606.02
See application file for complete search history.

(56) References Cited

U.S. PATENT DOCUMENTS

| 2,525,971 | A | * | 10/1950 | Stone | .................... | A47B 88/437 16/97 |
| 3,809,799 | A | * | 5/1974 | Taylor | .................... | H02G 3/045 174/68.3 |
| 4,749,159 | A | * | 6/1988 | Hoff | .................... | B60B 33/0002 16/29 |
| 4,830,318 | A | * | 5/1989 | O'Brien | ................ | A47F 5/0815 248/165 |
| 5,136,751 | A | * | 8/1992 | Coyne | .................... | B60B 33/00 16/29 |
| 5,220,740 | A | * | 6/1993 | Brault | .................... | F16M 11/42 248/910 |
| 5,813,503 | A | * | 9/1998 | Chang | .................... | A45C 5/146 190/115 |
| 5,878,518 | A | * | 3/1999 | Grewe | ................ | G09F 15/0056 248/910 |

(Continued)

*Primary Examiner* — Jonathan Liu
*Assistant Examiner* — Guang H Guan
(74) *Attorney, Agent, or Firm* — Dilworth & Barrese, LLP

(57) ABSTRACT

A wheel/foot assembly for a sign display stand or other object includes a cradle partially enclosing an optional wheel. The assembly is releasably attachable to a leg for a sign display stand, protects the leg and can be easily replaced if worn. The assemble protects wear on the stand and permits the sign display stand to be wheeled, rather than dragged or carried. Because the assembly is releasably attached, it can be replaced easily if damaged or worn.

16 Claims, 29 Drawing Sheets

(56) References Cited

U.S. PATENT DOCUMENTS

| | | | | |
|---|---|---|---|---|
| 6,450,515 B1* | 9/2002 | Guth | ............... | B60B 33/0063 |
| | | | | 16/30 |
| 6,550,100 B2* | 4/2003 | Drucker | ............... | A45C 5/14 |
| | | | | 16/19 |
| 6,826,800 B2* | 12/2004 | Kao | ............... | B60B 33/0002 |
| | | | | 16/29 |
| 7,503,439 B2* | 3/2009 | O'Shea | ............... | A45C 5/146 |
| | | | | 16/18 CG |
| 7,584,563 B2* | 9/2009 | Hillstrom | ............... | G09F 15/0056 |
| | | | | 248/346.2 |
| 7,770,329 B2* | 8/2010 | Hutnik | ............... | E05D 15/0669 |
| | | | | 49/410 |
| 7,798,455 B2* | 9/2010 | Kumazawa | ............... | A47B 3/0815 |
| | | | | 16/19 |
| 8,615,829 B2* | 12/2013 | Kenalty | ............... | A61G 1/013 |
| | | | | 5/625 |
| 9,175,801 B2* | 11/2015 | Adilman | ............... | G09F 7/22 |
| 9,437,123 B2* | 9/2016 | Glass, Jr. | ............... | B60B 37/00 |
| 9,830,838 B2* | 11/2017 | Struhl | ............... | G09F 7/18 |
| 10,127,844 B2* | 11/2018 | Calby | ............... | G09F 15/0056 |
| 2002/0179784 A1* | 12/2002 | Mehta | ............... | F16M 11/10 |
| | | | | 248/129 |
| 2011/0239506 A1* | 10/2011 | Glass, Jr. | ............... | G09F 15/0062 |
| | | | | 40/610 |
| 2018/0012527 A1* | 1/2018 | Struhl | ............... | G09F 15/0062 |

* cited by examiner

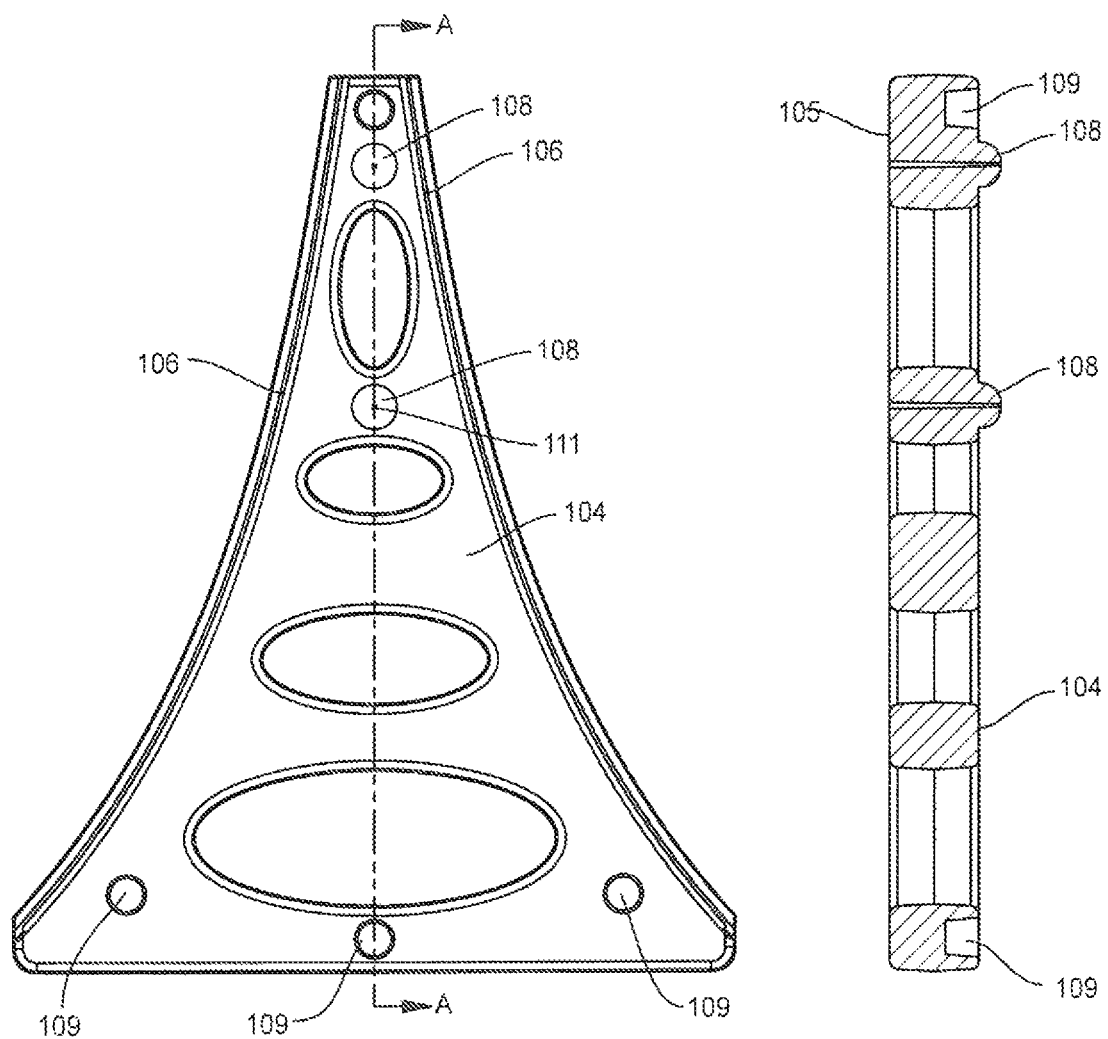

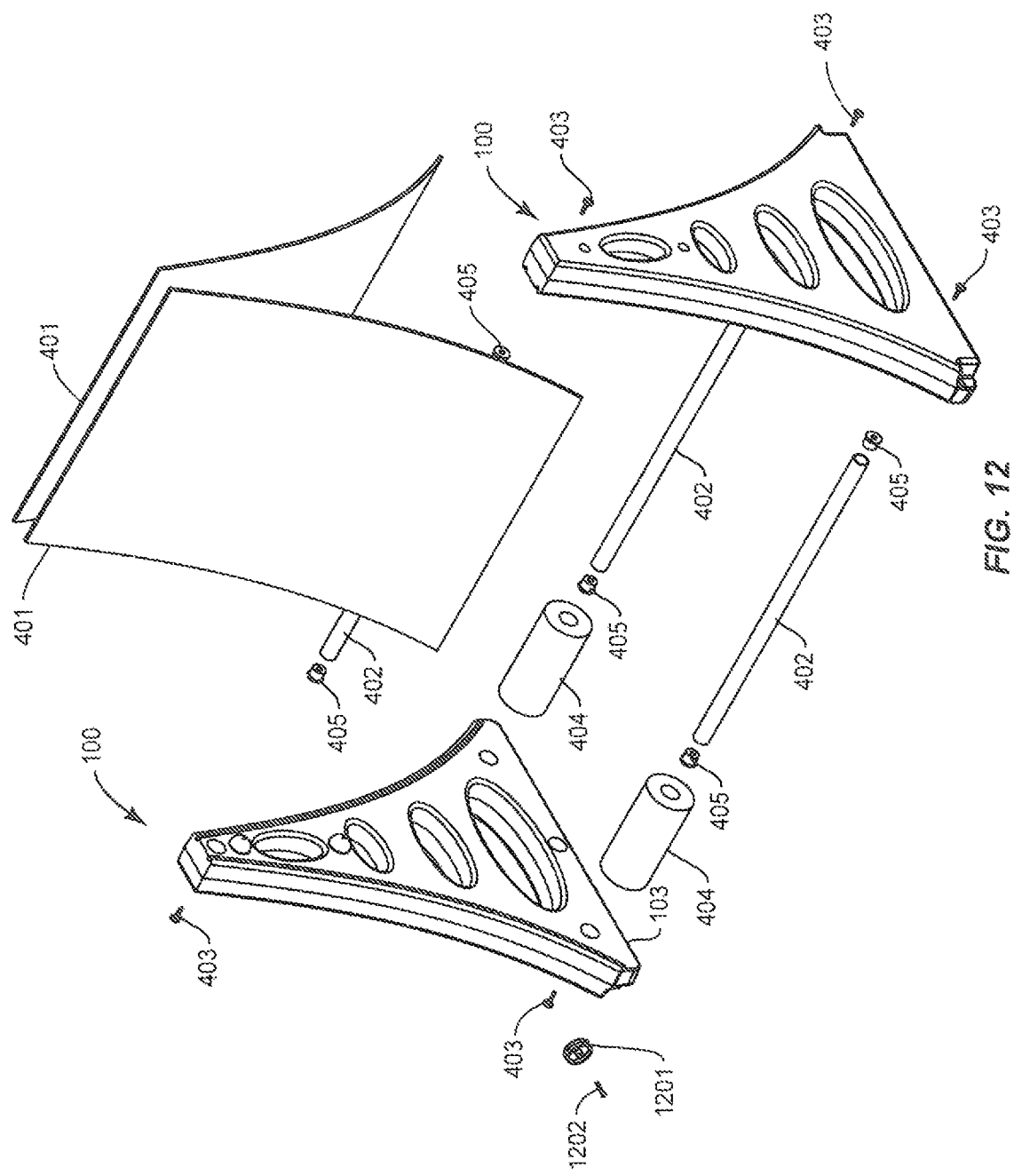

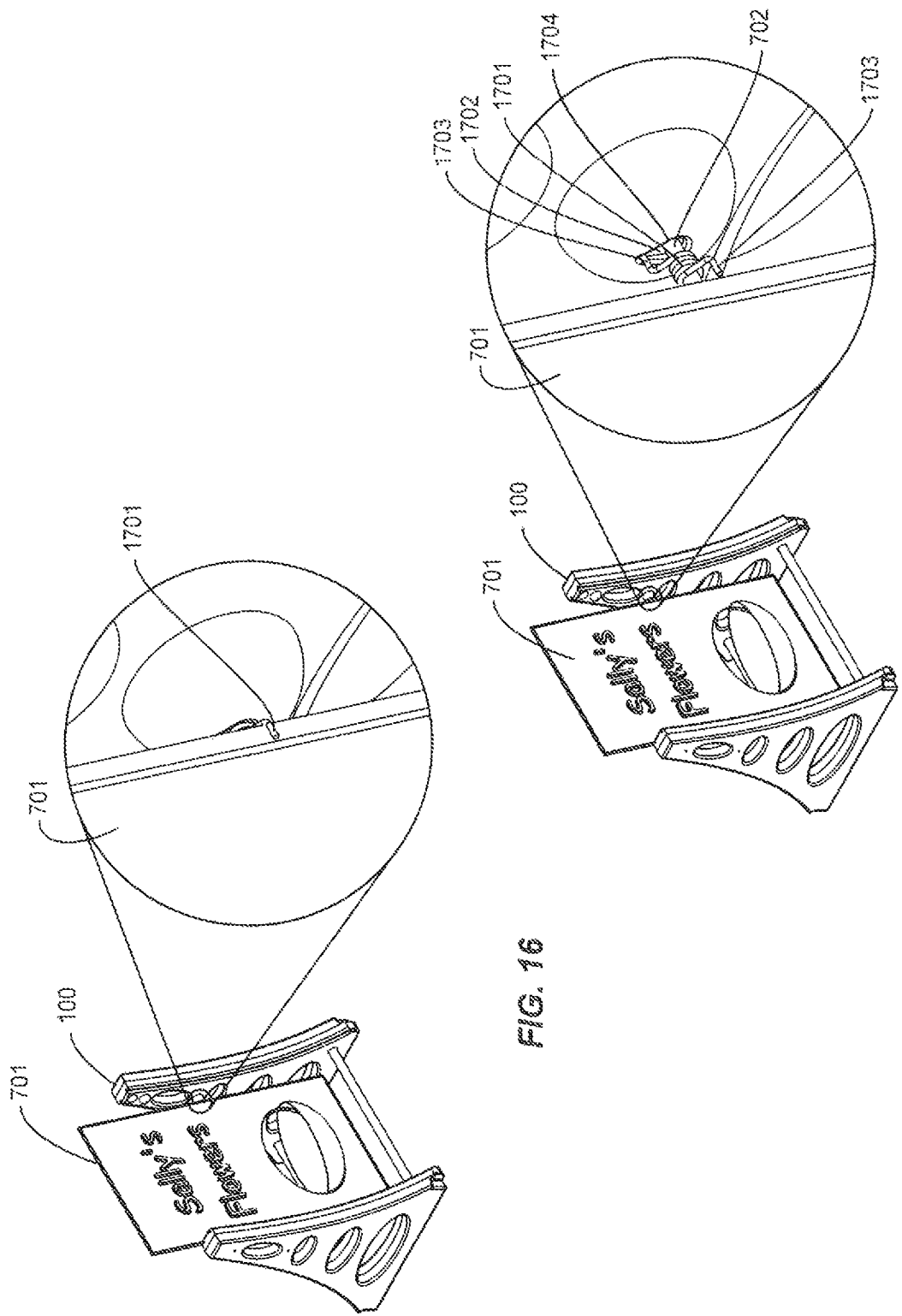

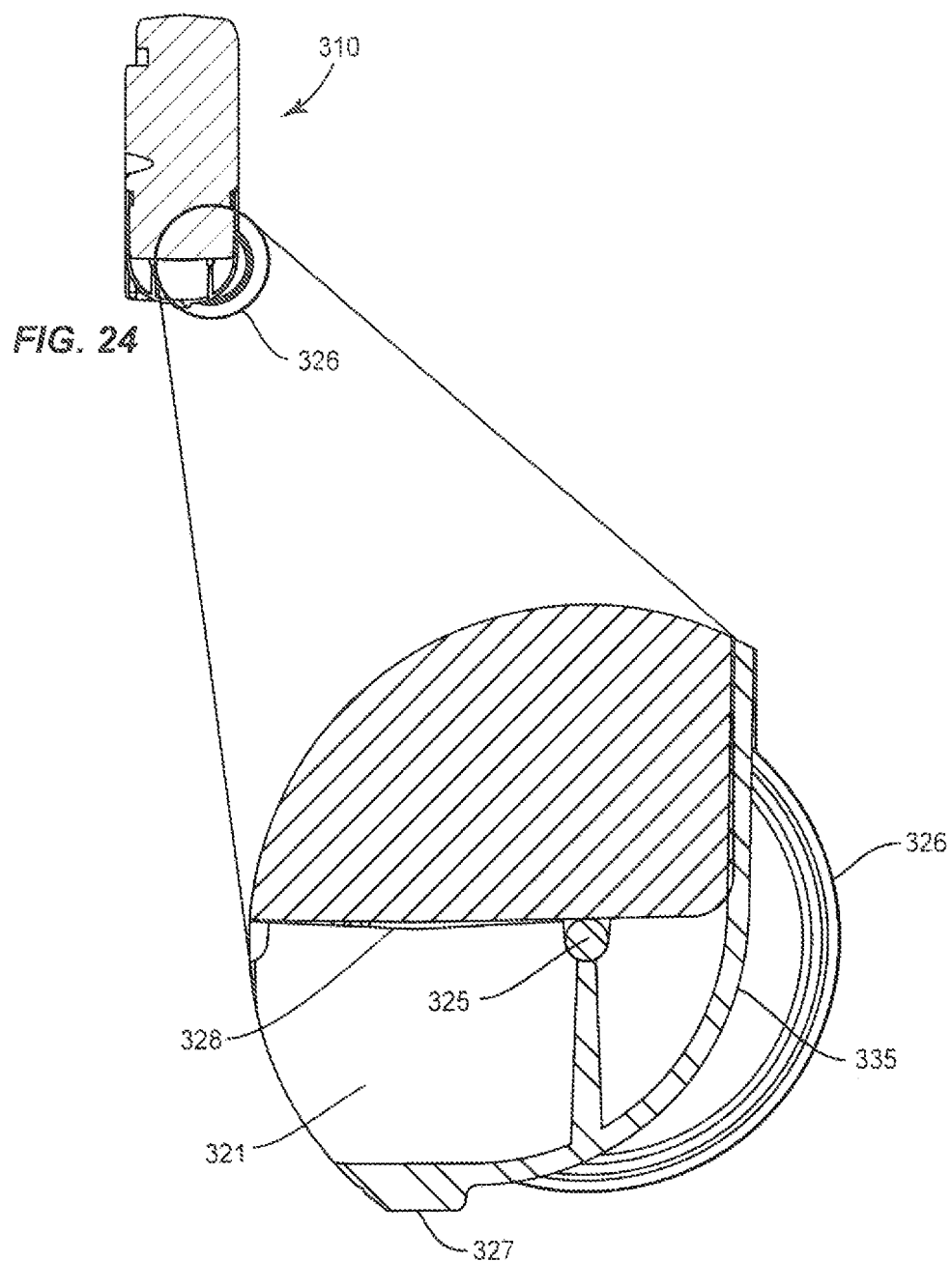

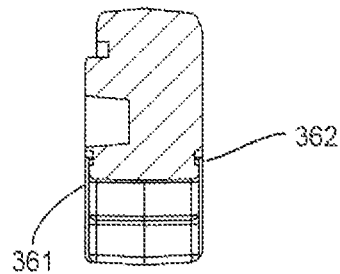
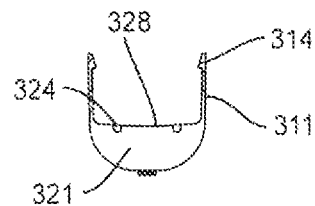
*FIG. 27*
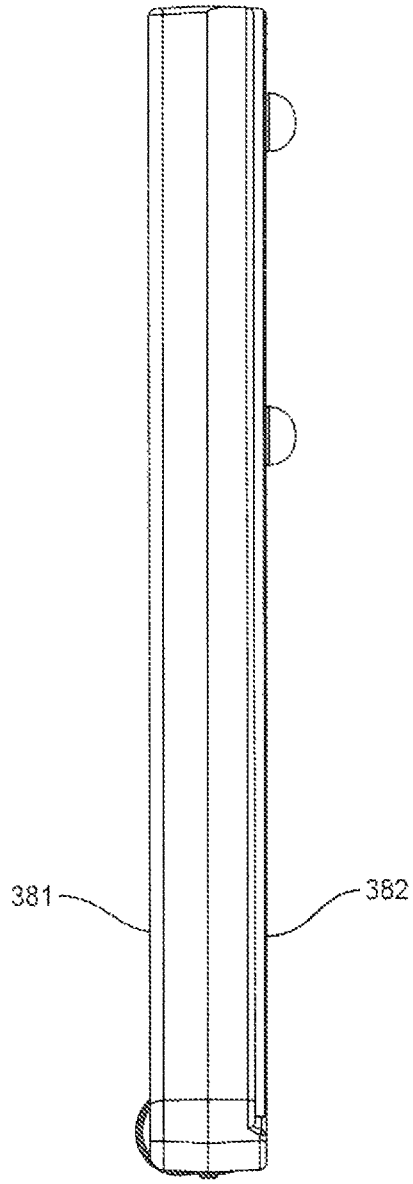
*FIG. 28*
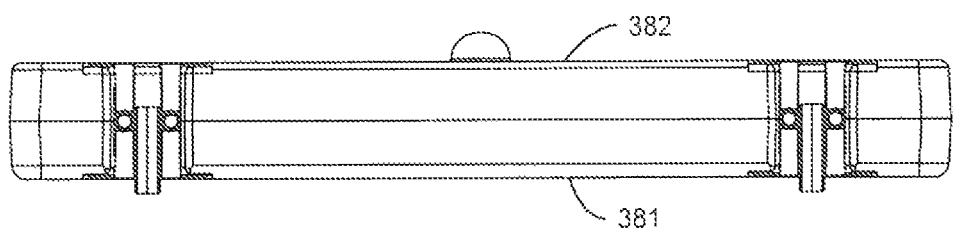
*FIG. 29*

REPLACEABLE WHEEL OR FOOT ASSEMBLY AND LEG SYSTEM FOR A SIGN DISPLAY STAND

REFERENCE TO PRIOR APPLICATIONS

This application claims priority to U.S. Provisional Application No. 62/360,617, filed Jul. 31, 2016, the entire contents of which are incorporated herein by reference.

TECHNICAL FIELD

The present disclosure relates generally to display stands and systems and components thereof for displaying free-standing signage, and more particularly, to a releasably attachable wheel and/or foot assembly that can easily attach and detach onto, and off of a leg of a stand or display and a leg assembly including the detachable wheel and/or foot for different types of display stands.

BACKGROUND OF THE INVENTION

Various sign display stands are in use today. Some sign stands are tripod or "A-frame" shaped and can be collapsed to a thin profile easily transported condition. Others use parallel legs connected with cross members. Some have a narrow profile to fit though doors and have different widths or heights to display different sized sign panels. Many sign display stands have either swinging or slide-in sign panels.

An example of a conventional sign display stand is shown generally in FIG. 42 as a stand 10. Stand 10 includes two legs 20, connected by a cross member 30. A display panel 40 is mountable on cross member 30, between legs 20.

In order to move stand 10, all of stand 10 must be lifted and carried, which is undesirable and exposes stand 10 to potential damage. Stand 10 can also be dragged on one or more of its legs, which it is also undesirable and can cause damage to the portion of the legs in contact with the ground and/or causes damage to the floor across which stand 10 is dragged. Many stands are hollow, for ease in carrying and then filled with water to provide weight to help them stay in place. Therefore, if the portions of the stand in contact with the ground become worn, either from being dragged or just normal wear and tear, the water filled legs may leak and ruin the utility of the stand.

Certain conventional stands have wheels. However, these prior art wheel assemblies are not suitably replaceable and can require tools and complicated procedures to fasten and unfasten the wheels to the legs. Conventional stands also lack acceptable configurations for the convenient installation and removal of wheel/foot assemblies to make such replacement satisfactorily convenient.

Certain conventional stands can be difficult to maintain in place. In addition, many conventional stands are insufficiently useful, regardless of any wheel system. For example, many conventional stands cannot accommodate either of a swinging panel and a slide-in sign panel, and swinging signs of different height sign panels from multiple pivot points. In addition, many conventional stands use interconnected legs and a variety of dedicated sizes and styles to accommodate either swinging or slide-in sign panels of different heights. Many signs use different leg designs for wheels and/or handles. Many signs display single sized sign panels and do not offer interchangeability between swinging and slide in modes, or different heights for swinging signs.

Accordingly, it is desirable to provide an improved display stand, wheel assembly and wheel/stand system that overcomes deficiencies in the prior art.

SUMMARY OF THE INVENTION

Generally speaking, in accordance with the invention, an improved replaceable wheel/foot assembly and a display stand including the wheel/foot assembly is provided. As used herein, unless specifically indicated, the wheel assembly can be converted to a foot assembly by removing the wheel, and will hereinafter, be referred to as a wheel assembly.

In one embodiment of the invention, the wheel assembly can include a cradle and structures and configurations adapted to attach the cradle to a leg portion of the display sign stand (or other object). In one embodiment of the invention, the wheel assembly can be clipped onto the stand or other object, without the need for screws, bolts or other fasteners. The wheel assembly can be attached by one or more of: a resilient clamping action, the interaction of protrusions, such as hooks or claws into recesses or grooves, screws or bolts, and/or with a tongue and groove arrangement. The wheel assembly attachment configuration can permit easy assembly and removal of the cradle from the leg of a display stand, or object. Furthermore, the assembly can be removed, the wheel removed and the wheel-less assembly replaced, to act as a protective foot to reduce wear on the bottom portion of the leg. This is particularly important with water filled designs.

In one embodiment of the invention, the wheel is located in the cradle, and positioned so that it will not contact the ground when the display stand is positioned in its normal assembled configuration, which may be inclined to the ground or other surface on which the stand is supported. The wheels can be positioned so that they extend substantially sideways from the frame and substantially above the ground, so that as the frame is tilted towards the wheels, the wheels will eventually become loaded with the weight of the display stand, the display stand will be lifted off the ground and the display stand can be moved, easily, because the wheels can roll freely in the tilted position.

The wheel assembly can be constructed with two flattened bottom portions, with the wheel extending from a side thereof. The first flattened bottom portion is preferably substantially perpendicular to the longitudinal axis of the leg, configured to rest flat when the leg is perpendicular to the ground. Therefore, if installed on an A-frame stand, the stand can rest on the first flat portion when the stand is in the collapsed travel configuration. The second flat bottom portion is preferably at an obtuse angle to the first flat portion and an acute angle to the longitudinal axis of the leg. The second flat portion can be located farther from the exposed portion of the wheel than the first flat portion, to rest flat on the ground when the leg is inclined to the ground, in an in-use A-frame position. Both positions protect the bottom of the leg from the ground, even if the wheel is not present. To that end, ribs, feet and other structures can be included at the bottom of the wheel, assembly to reduce problems associated with wear.

In one embodiment of the invention, only one leg of a two leg stand includes wheels. However, the wheel-free leg should include a wheel-less wheel assembly, to protect the leg from the ground. Therefore, the replaceable assembly, not the leg, will become worn with use and can be replaced, while protecting the stand. This can be especially important with water filled stands.

The stand can have a leg formed with a bottom portion configured to receive the wheel assembly. In one embodiment of the invention, the bottom of the leg includes a gap to receive the top half of the wheel and a pair of shoulders on both sides of the gap, to receive the axle of the wheel. A recess for receiving a cradle for holding the wheel and for contacting the ground and positioning the leg off the ground can also be formed in the leg. Recesses, openings and protrusions can also be formed in the leg to help attach the wheel assembly to the leg, with or without the use of screws or bolts. For example, two attachment plates with inwardly facing claws can extend up from the cradle. The claws can engage a groove in the leg as the wheel assembly is slipped over the bottom of the leg.

The stand itself can include a universal multi-use, interchangeable leg that allows the user to change sign panel size, height, format and display method quickly and easily without replacing the legs, which can be the most expensive part of the display stand. The stand can also be in the form with an A-frame design, which can be collapsed into a narrow profile for ease in transport.

A universal leg can provide the user with a variety of display options. From a manufacturing perspective, the universal leg is less expensive to produce, due to economies of scale and lower cost molding methods, and requires less inventory since one leg can replace many different leg styles.

Accordingly, a wheel assembly and sign display stand is provided. The display stand can be configured to receive the wheel assembly and can include a leg having a base at a bottom portion thereof, a first side extending up from one end of the base; a second side extending up from an opposite end of the base; an inner surface extending up from the base and intersecting edges of the first side and the second side; an outer surface extending up from an opposite side of the base as the inner surface and intersecting opposite edges of the first side and the second side as intersect the inner surface; and a top portion where the first side, second side, inner surface and outer surface all meet. The leg can include a first channel located in the inner surface at a position closer to the first side than to the second side, the first channel configured to receive the edge of a sign panel; and an optional second channel located in the inner surface at a position closer to the second side than to the first side, the second channel configured to receive the edge of a sign panel. The leg can include at least one protuberance extending out from and positioned on the inner surface, preferably substantially along a longitudinal axis of the leg, optionally close to a top end of the inner surface, where the first side intersects the second side.

Other embodiments of the invention will be apparent from the drawings and the specification to follow and the scope of the invention will be indicated in the claims.

BRIEF DESCRIPTION OF THE DRAWINGS

The present disclosure will become more readily apparent from the specific description accompanied by the following drawings, in which:

FIG. 2 is a plan view of a sign display stand leg according to one embodiment of the present disclosure;

FIG. 3 is a side cross sectional view a long line AA of the sign display stand leg of FIG. 2;

FIG. 12 is an exploded view of a sign display stand having wheels, according to one embodiment of the present disclosure;

FIG. 16 is a perspective partially enlarged view of an assembled sign display stand having a torsion spring, according to one embodiment of the present disclosure;

FIG. 17 is a perspective partially enlarged view of a partially assembled sign display stand having a torsion spring, according to one embodiment of the present disclosure;

FIG. 24 is a cross-sectional view along line BB of a portion of the leg of FIG. 23;

FIG. 25 is an enlarged view of the cross-sectional view of FIG. 24;

FIG. 27 is a cross-sectional view of a portion of the assembly of FIG. 26 taken along line CC;

FIG. 28 is a side view of the assembly of FIG. 23;

FIG. 29 is a bottom plan view of the assembly of FIG. 23;

FIGS. 32A and 32B each show an alternate enlarged partial view of the display stand leg and wheel assembly of FIG. 23;

Throughout the disclosure, like reference numerals will be used to indicate similar elements.

DETAILED DESCRIPTION OF THE PREFERRED EMBODIMENTS

Figure 1:
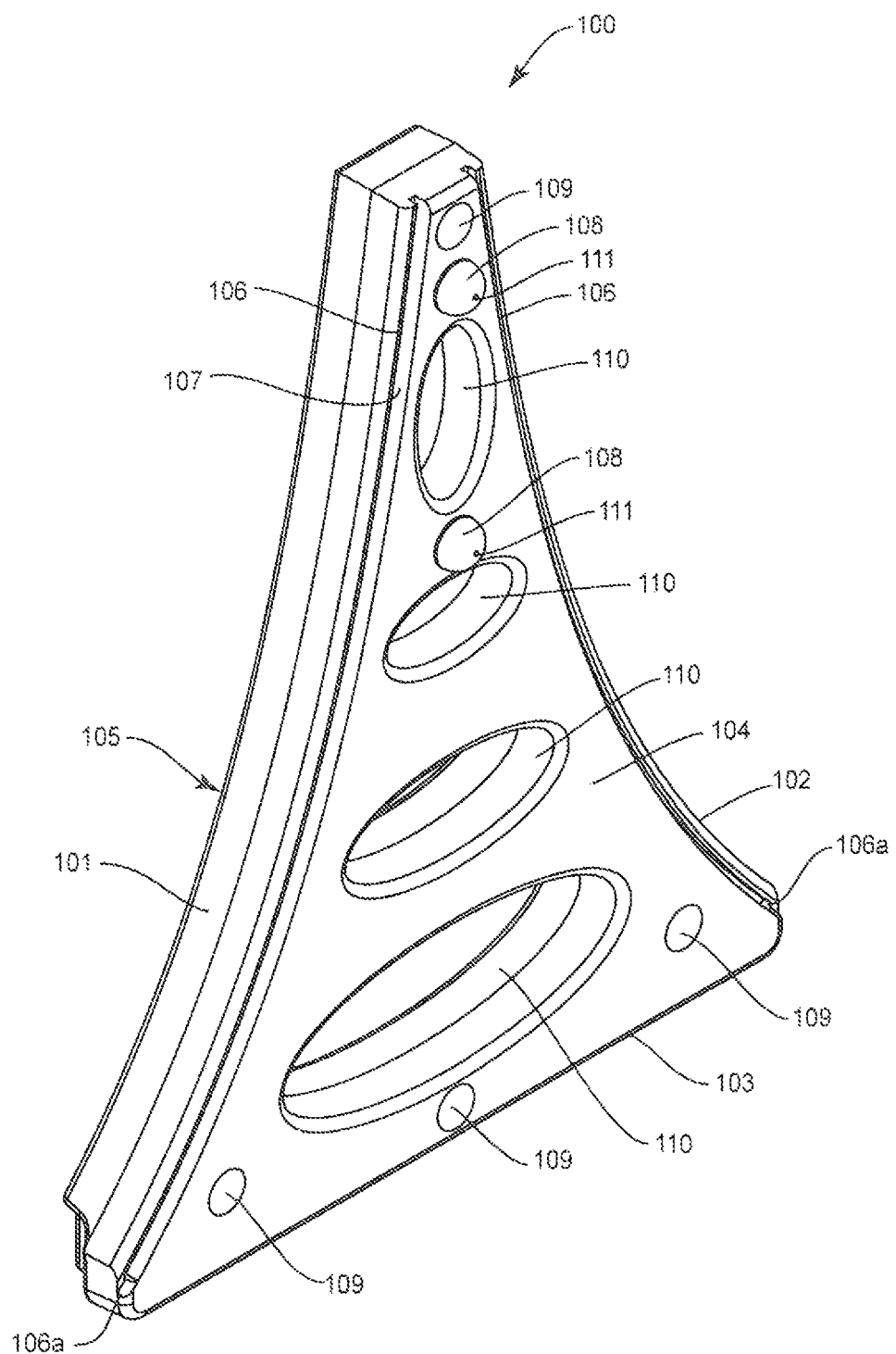
FIG. 1 is a perspective view of a sign display stand leg according to one embodiment of the present disclosure.

The present disclosure may be understood more readily by reference to the following detailed description, taken in connection with the accompanying drawing figures, which form a part of this disclosure. It is to be understood that this disclosure is not limited to the specific devices, methods, conditions or parameters described and/or shown herein, and that the terminology used herein is for the purpose of describing particular embodiments, by way of example only, and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within, the scope of the disclosure. In particular, they are intended to refer to the spatial reference of the display stand in its normal, assembled configuration during intended use.

A display stand in accordance with one embodiment of the invention can include two legs and each leg can include a first side; a second side and a base. An inner surface of the legs can be defined by the first side, the second side and the base. An outer surface of the legs can be defined by the first side, the second side and the base. The outer surface can face the opposite direction of the inner surface. A channel can be defined at or about at least one of the first side and second sides on the inner surface. The channel can be configured to receive a sign panel. At least one protuberance can be positioned on the inner surface and can be substantially along a longitudinal axis of the leg. One or more cross tubes and/or cross roads can be provided for connecting the two legs in a spaced apart configuration.

An improved easily replaced wheel assembly, in accordance with the invention, can be clipped (slid into friction-fit engagement) onto the stand, without the need for (but not precluding the use of) screws, bolts or other fasteners. The wheel assembly can include a well-shaped cradle and structures and configurations adapted to attach the cradle to a leg portion of the display frame. Screws, bolts and other fasteners can also be used alone or in combination with other attachment methods. The assembly can be used with or without the wheel to protect the bottom of the leg from wear caused by contact to the ground.

The cradle can be positioned to extend from the bottom of the leg of a stand. The leg can include a recess to receive the wheel, as well as a recess to receive the top of the wheel axle. The recess should be sized to permit the wheel to spin in the recess. The leg can also include a larger recess to receive some or substantially all of the cradle. In one embodiment of the invention, the bottom of the cradle is substantially flush with the bottom of the leg, but protects the leg from the ground. The top half of the wheel, above the axle, can be located in the wheel recess with the axle below the recess. The cradle can extend from the bottom of the leg or be partially or substantially fully received in a cradle recess of the leg below the wheel recess.

In one embodiment of the invention, the wheel is partially enclosed by the cradle. The wheel can be positioned so that it will not bear the weight of the stand when the display stand is positioned in its normal assembled configuration, which in many configurations, is inclined away from an exposed portion of the wheel. In a preferred embodiment of the invention, less than half of the wheel is exposed from the side of the leg, outside the cradle. In a more preferred embodiment, less than about one third or even less than about 20% of the wheel is exposed outside the cradle. When the stand is in its normal, assembled configuration and resting on the ground or other supporting base, the wheels can be positioned so that they extend to the side of the frame so that when the top of the frame is pivoted downwards, towards the ground, the wheels will contact the ground, receive the weight of the stand, the reminder of the stand will be lifted, and the display stand can be moved, easily, because the wheels can roll freely in this tilted position. In one embodiment of the invention, the wheel assembly can be easily removed from the leg, and replaced or repaired if it becomes worn or damaged, without the need for a complicated repair or replacement procedure or the wheel can be removed and the wheel-less assembly will rest on the ground and reduce wear and tear on the bottom of the stand leg.

The stand leg or other object can include a recess to receive a part of the wheel assembly. In one embodiment of the invention, the recess includes a slot or gap to provide clearance for the wheel to spin freely. The bottom of the leg or object is positioned over the wheel axle to help hold the axle in the assembly. In one embodiment of the invention, the recess has a stepped-type configuration, with a slot for the wheel to spin and shoulders on both sides of the slot to receive a portion of the wheel assembly, so that the assembly is flush with the bottom of the leg or object. In this embodiment, the shoulder helps hold the axle in the assembly. The surface of the leg bottom or shoulder opposing the axle can be flat, but is preferably contoured to the shape of the axle.

Reference will now be made in detail to the exemplary embodiments of the present disclosure, which are illustrated in the accompanying figures.

Features of the leg to which the wheel assembly can be attached will be shown generally with reference to FIGS. 1-17. Features of the wheel assembly and modifications to the leg to facilitate attachment of the assembly to the leg will be shown generally with reference to FIGS. 18-40.

As shown in FIGS. 1-10, a leg 100 for a sign display stand includes a first side 101, a second side 102 and a base 103. First side 101, second side 102 and base 103 define an inner surface 104. An outer surface 105 (shown in FIG. 1) is also defined by first side 101, second side 102 and base 103, and faces in the opposite direction as inner surface 104.

The shape of leg 100 can be a triangle as shown, but other shapes are contemplated. In addition, first side 101 and second side 102 can be concave (as shown), straight or convex, and can vary in degrees. The concave shape provides for extra support and strength to leg 100.

In addition, leg 100 can be designed with structural holes 110 for even greater strength and support. The curved shapes of structural holes 110 provide additional strength, but structural holes 110 can be of any varying shapes and sizes. Structural holes 110 also serve the purpose of reducing wind resistance of a sign display stand when assembled.

A channel 106 is formed at or about first side 101 on inner surface 104. For a two-sided display stand, a second channel 106 is provided at or about second side 102. Channel 106 is shown with a similar contour as first side 101, but can be of a different contour. Channel 106, having the contour shown, provides for extra support and strength of a slide-in sign panel when inserted (e.g., see FIG. 5). The width of channel 106 is sized to accept a slide-in sign panel. Channel 106 is typically less than 1 inch in width, preferably ½ to ¼ inches and most preferably has a width of about ⅜ of an inch, to accommodate most sign panels. Channel 106 typically includes a channel stop 106a positioned at the lower end of channel 106 to prevent the slide-in sign panel from sliding out of the bottom of channel 106.

Figure 4:
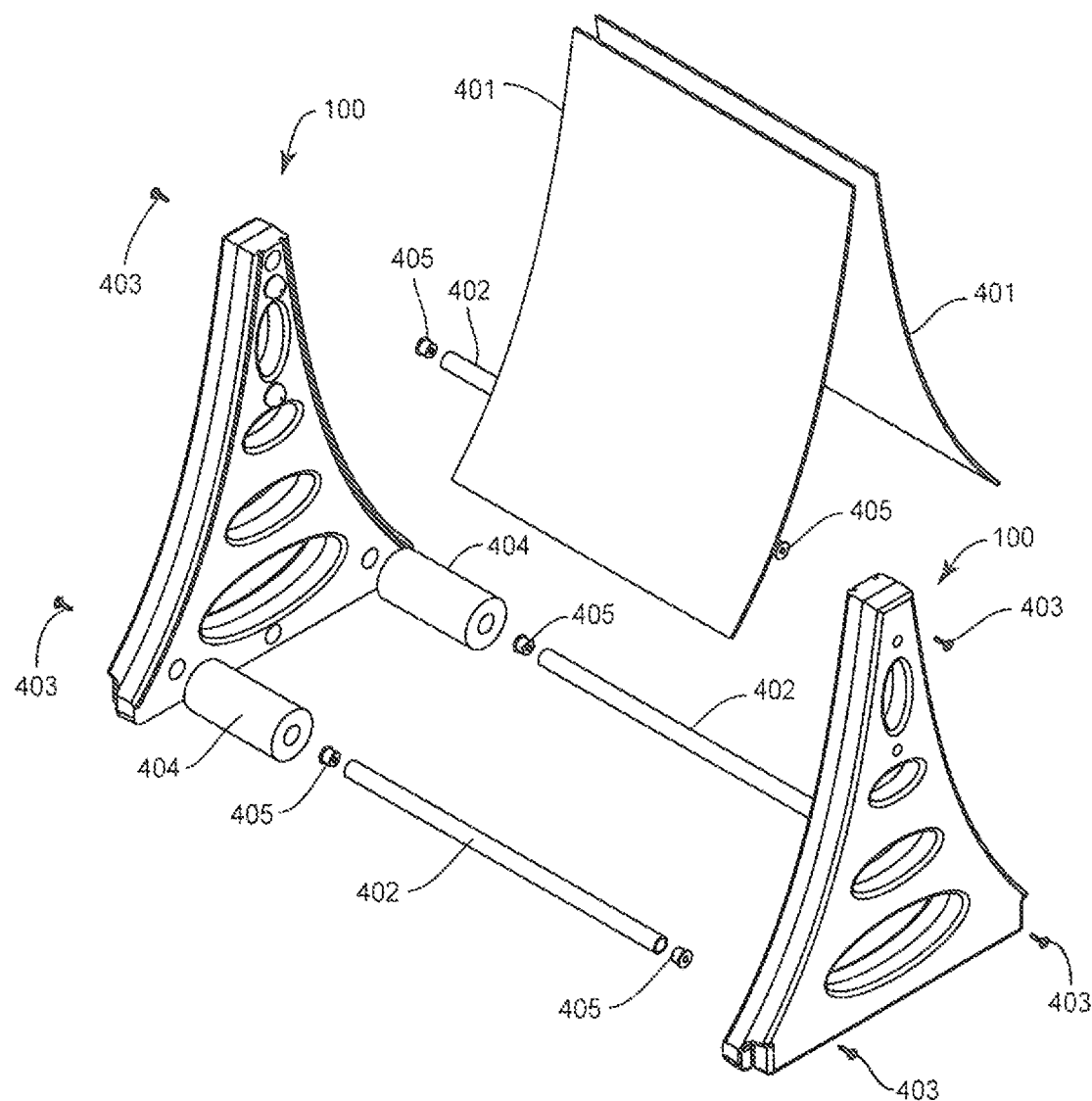
FIG. 4 is an exploded view of a sign display stand according to one embodiment of the present disclosure.

Referring now to FIG. 4, in order to create a deeper back section for added support of a slide-in sign panel 401, a raised inner portion 107 can be configured on inner surface 104 of leg 100. Raised inner portion 107 can also prevent slide-in sign panel 401 from blowing in. Raised inner portion 107 is shown in the figures as extending the entire inner surface 104 itself being raised, but other configurations are contemplated. For example, raised inner portion 107 can be configured as a raised edge or a series of raised sections, each of which would create the added support for the slide in sign panel 401.

Positioned along a longitudinal axis of leg 100 are one or more optional protuberances 108. Each protuberance 108 includes an optional through hole 111 that extends through both inner surface 105 and outer surface 105. Protuberances 108 support cross rods 702 (see FIG. 7) to create pivot points (see FIG. 11) at various heights to accommodate different sized swinging sign panels 701/901 (see also FIG. 9). Protuberances 108 can be used with or without spacers or U channels 703 to allow swinging sign panel 701 to swing freely.

As shown in FIGS. 16 and 17, protuberances 108 may include holes 1704, configured to accept a torsion spring 1701 that wraps around the pivot point (i.e. cross rod 702) with perpendicular arms 1703 that extend onto or into both the side of a swinging sign panel 701 and into the protuberance 108, in order to limit the travel of the swinging sign panel 701 in either direction. Other configurations of a torsion spring or other resilient member to accomplish the results are contemplated.

Leg 100 can include one or more optional recess 109 for cross tubes 402. Recesses 109 typically include through holes for hardware (e.g., screw 403). Cross tubes 402 connect 2 legs 100 and provide spacing for sign panel(s) 401, 701 or 709. Three or more cross tubes 402 can be used for slide-in sign panel(s) 401. Two or more cross tubes 402 and a cross rod 702 can be used for swinging sign panels 701 or 901. Cross tubes 402 and cross rods 702 can be supplied in a variety of lengths with shorter cross tubes 402 and/or cross rods 702 being used to display a vertical sign panel, and longer cross tubes 402 and/or cross rods 702 being used to display a horizontal sign panel. A cross tubes 402 inserted into upper recess 109 can be used to display a banner (not shown). Although recesses 109 are described herein, one skilled in the art will understand a stand can be assembled using leg 100 without recesses 109.

Figure 6:
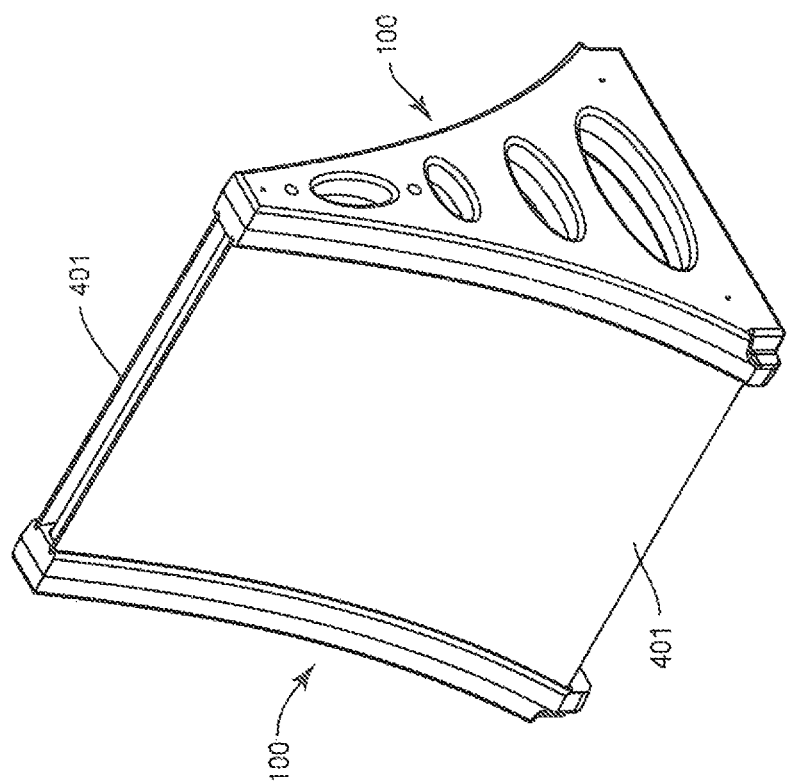
FIG. 6 is a perspective view of an assembled sign display stand according to one embodiment of the present disclosure.
Figure 5:
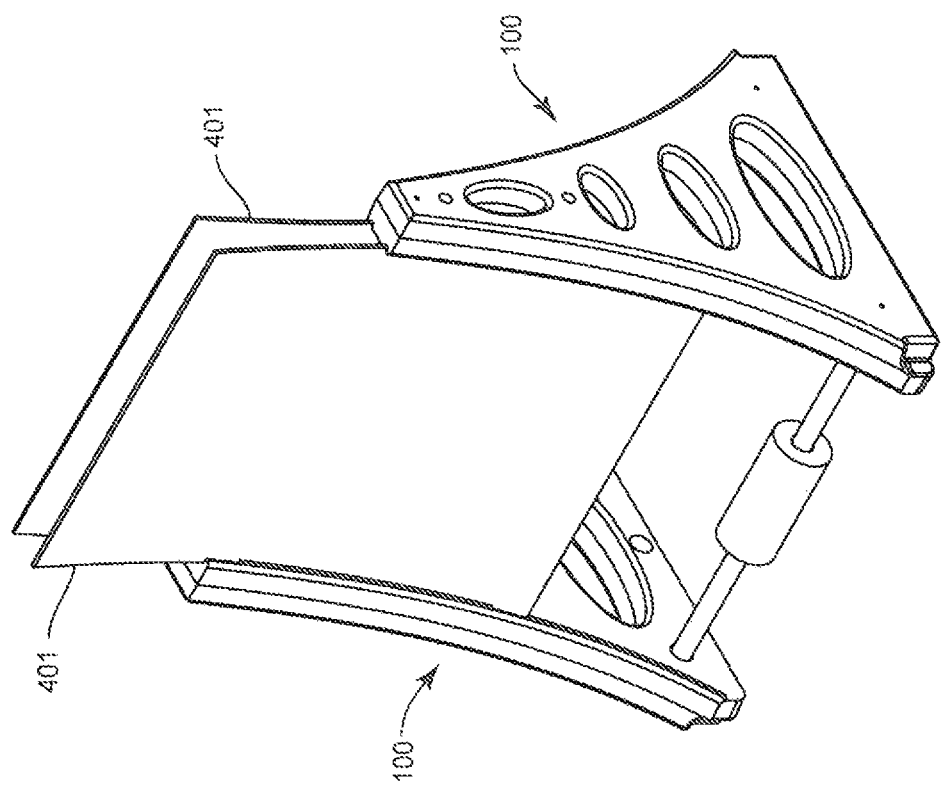
FIG. 5 is a perspective view of a partially assembled sign display stand according to the present disclosure.

FIGS. 4-6 illustrate slide-in sign panel stands in various degrees of assembly utilizing universal leg 100. In addition to the components described above, assembled stand also can include a spacer 404 to provide support to slide-in sign panel 401. Inserts 405 can also be used to provide support and strengthen cross tube 402. FIG. 4 is an exploded view of a sign stand with universal legs 100 in its slide-in sign panel configuration. FIG. 5 is a partially assembled sign stand with universal legs 100 in its slide-in sign panel configuration. FIG. 6 is an assembled a sign stand with universal legs 100 in its slide-in sign panel configuration.

FIGS. 7-10 illustrate swinging sign panel stands having different sized sign panels in various degrees of assembly utilizing universal leg 100. In addition to the components described above, an assembled stand in accordance with the embodiments of the invention also can include one or 2 knob(s) 704 to attach to a threaded end of cross rod 702 to hold cross rod 702 in place.

Figure 7:
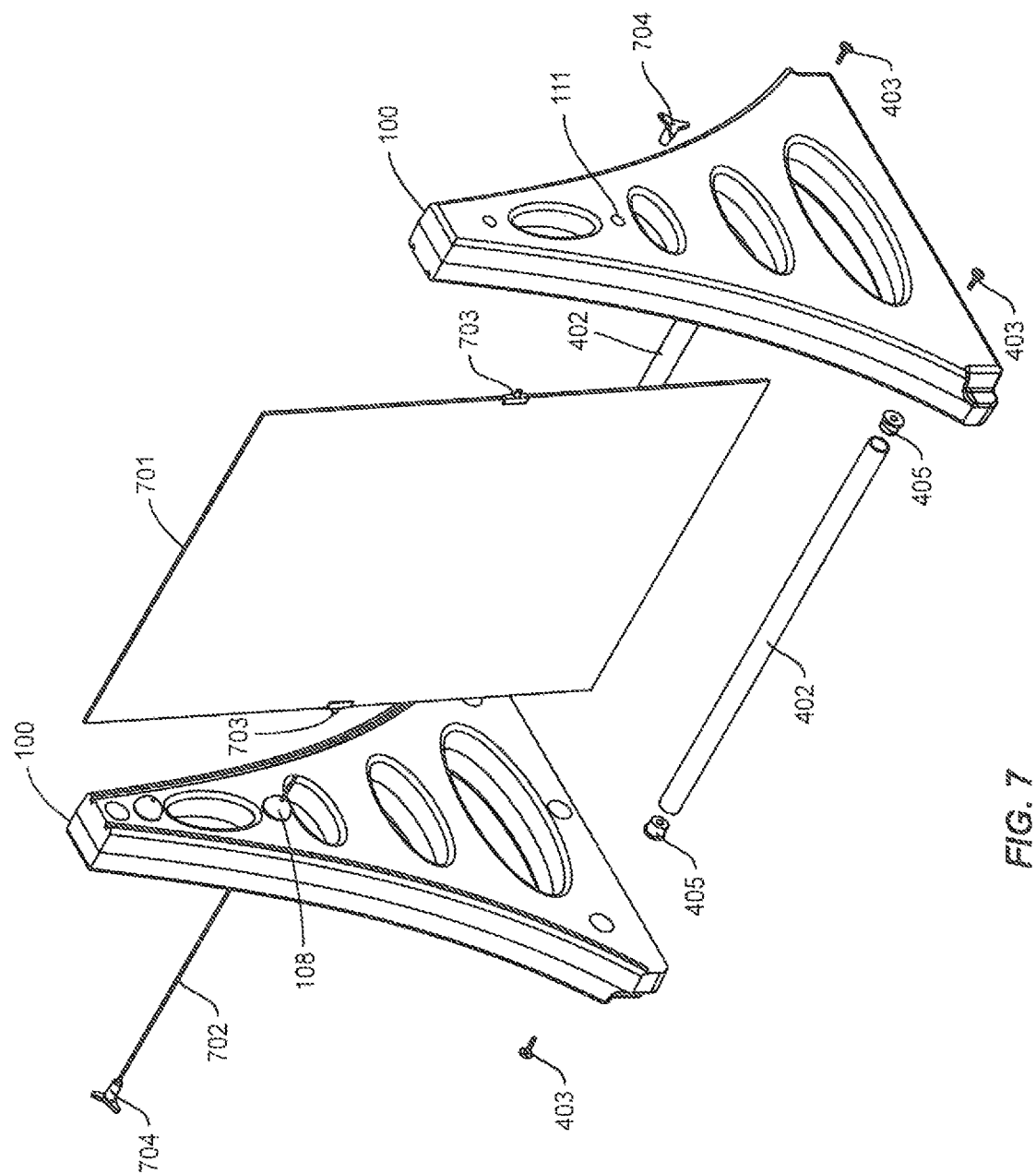
FIG. 7 is an exploded view of a sign display stand according to one embodiment of the present disclosure.
Figure 8:
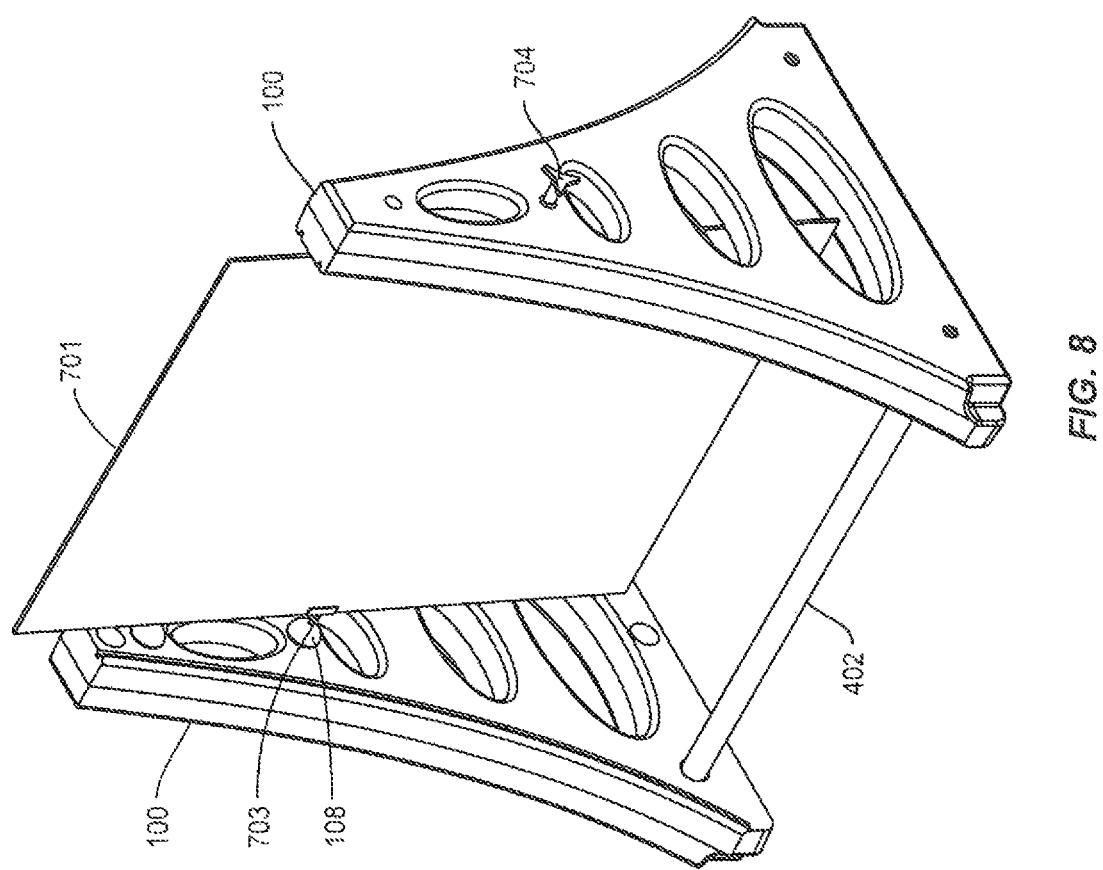
FIG. 8 is a perspective view of an assembled sign display stand according to one embodiment of the present disclosure.

FIG. 7 is an exploded view of a sign stand in accordance with preferred embodiments of the invention, with universal legs 100 in a swinging sign panel configuration. FIG. 8 is an assembled sign stand with universal legs 100 in a swinging sign panel configuration. This configuration employs a relatively smaller swinging sign panel 701 that utilizes a lower set of protuberances 108.

Figure 9:
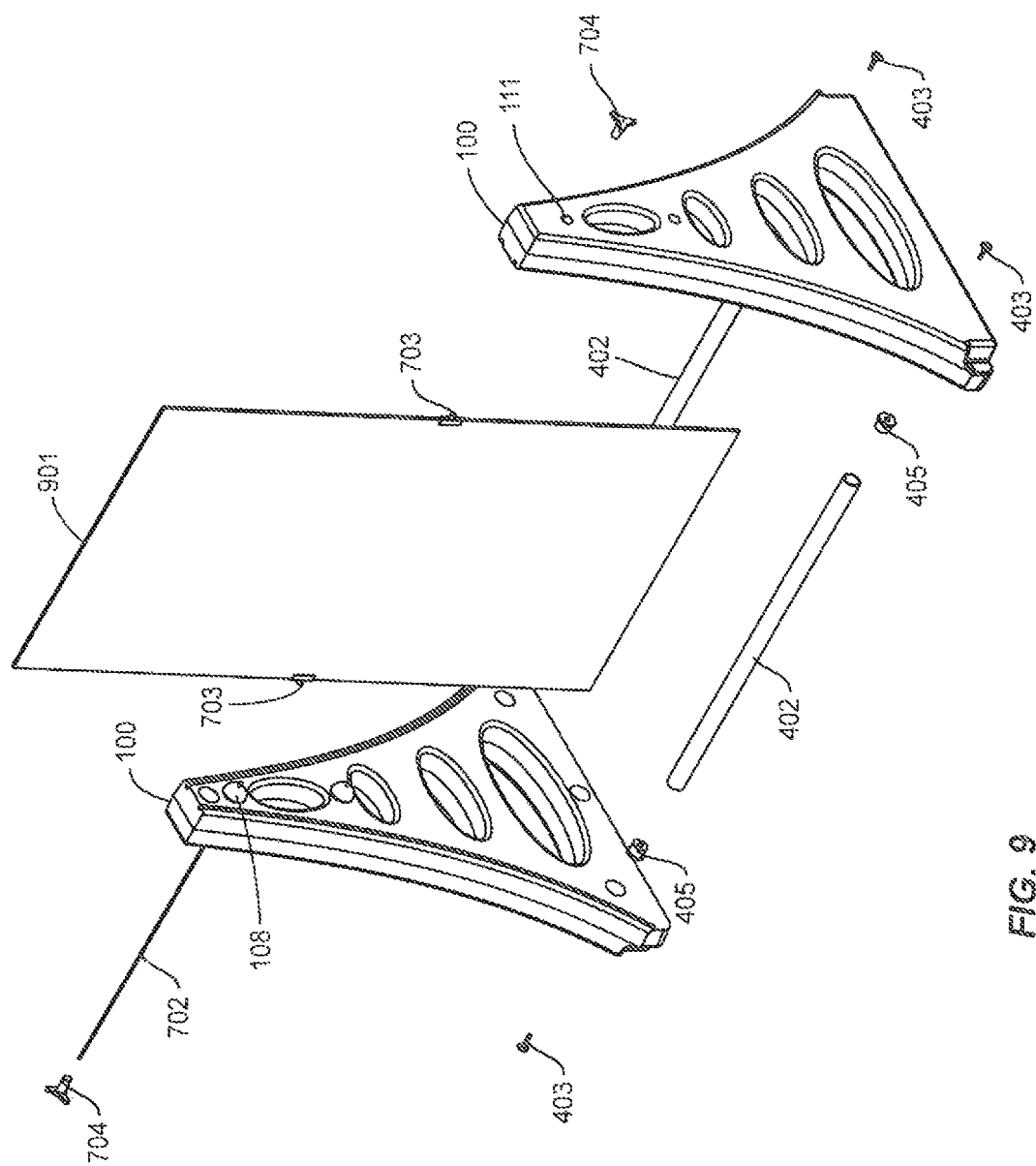
FIG. 9 is an exploded view of a sign display stand according to one embodiment of the present disclosure.
Figure 10:
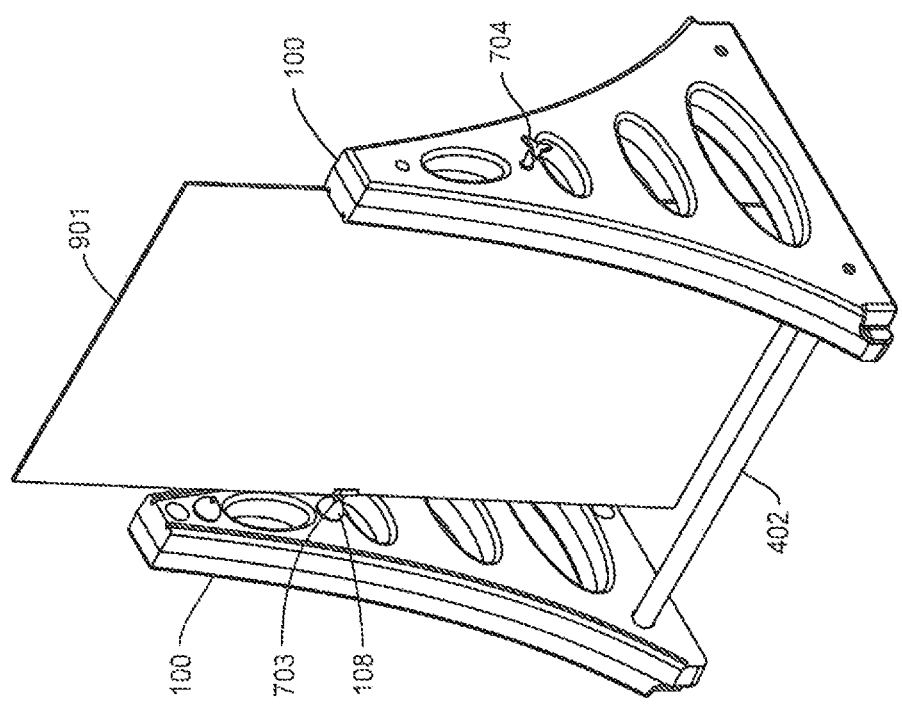
FIG. 10 is a perspective view of an assembled sign display stand according to one embodiment of the present disclosure.
Figure 11:
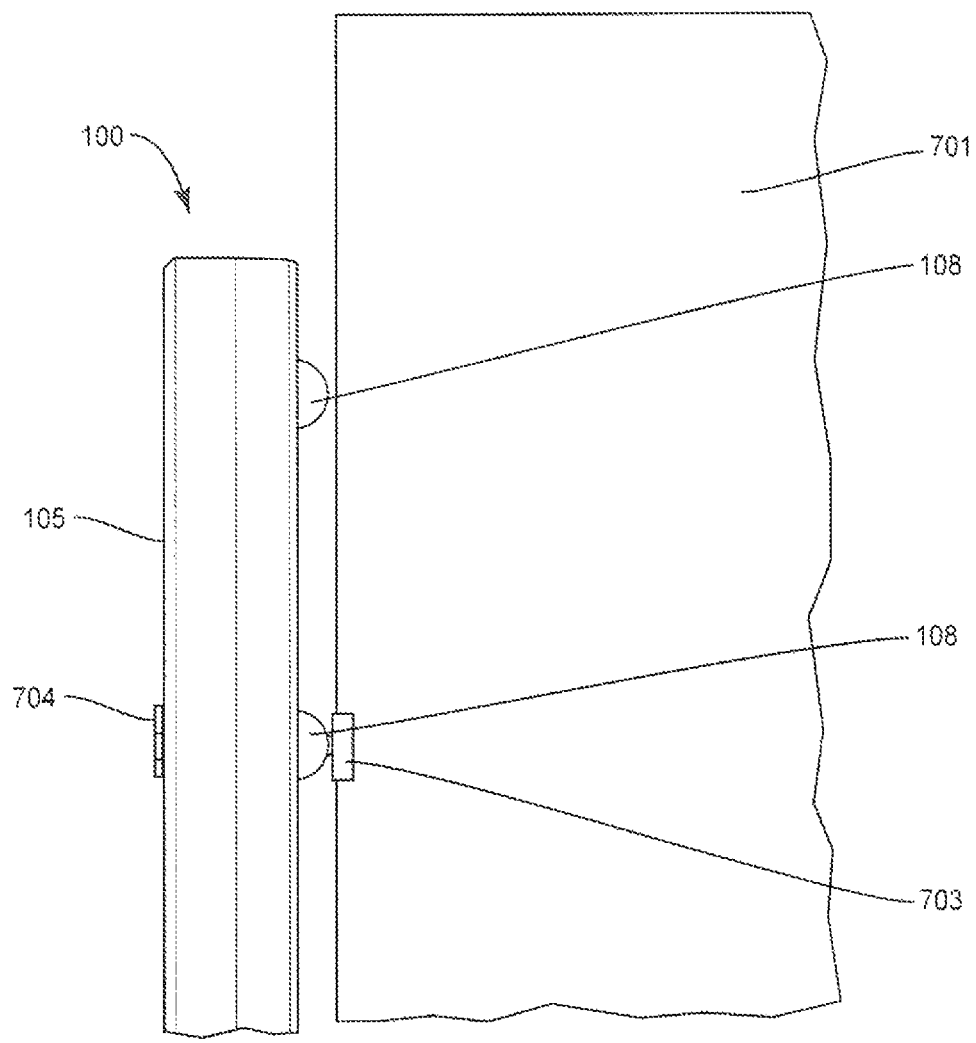
FIG. 11 is a partial front view of an assembled sign display stand according to one embodiment of the present disclosure.
Figure 15:
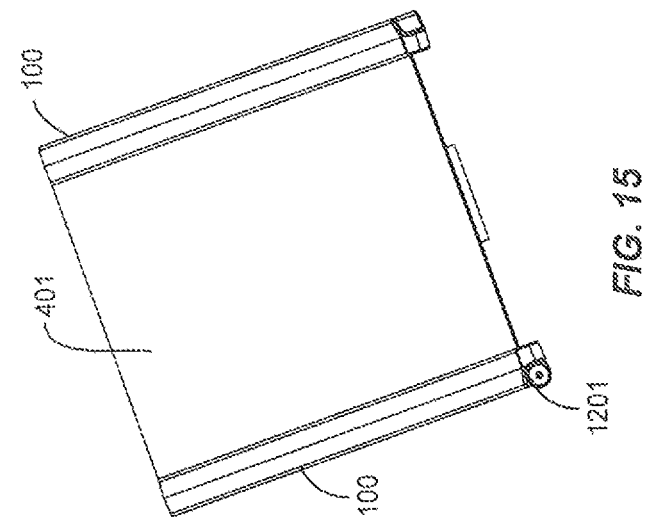
FIG. 15 is a perspective view of an assembled sign display stand having wheels in use, according to one embodiment of the present disclosure.
Figure 14:
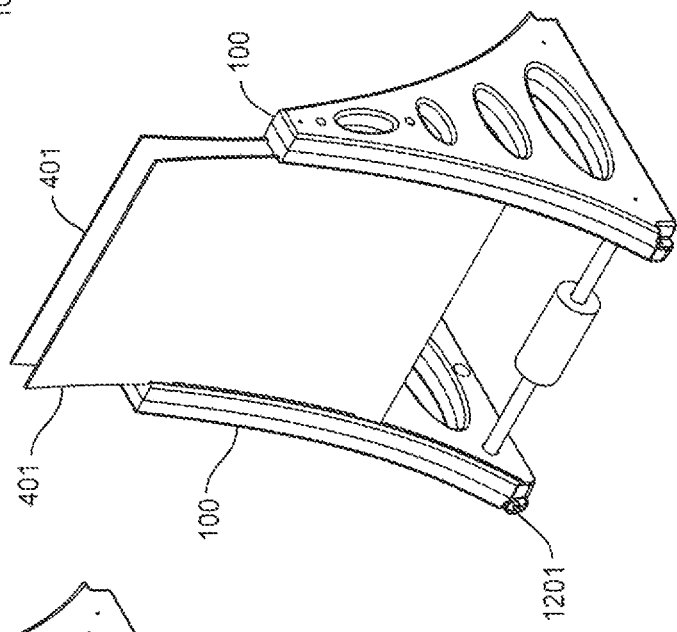
FIG. 14 is a perspective view of a partially assembled sign display stand having wheels, according to one embodiment of the present disclosure.
Figure 13:
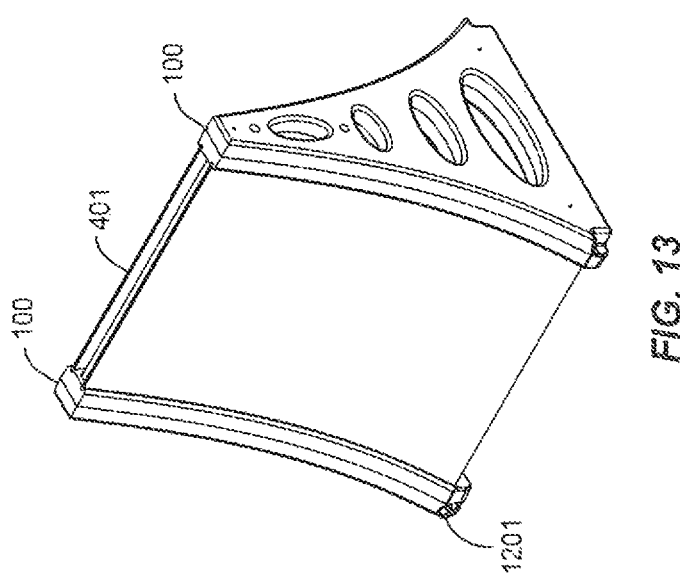
FIG. 13 is a perspective view of an assembled sign display stand having wheels, according to one embodiment of the present disclosure.
Figure 19:
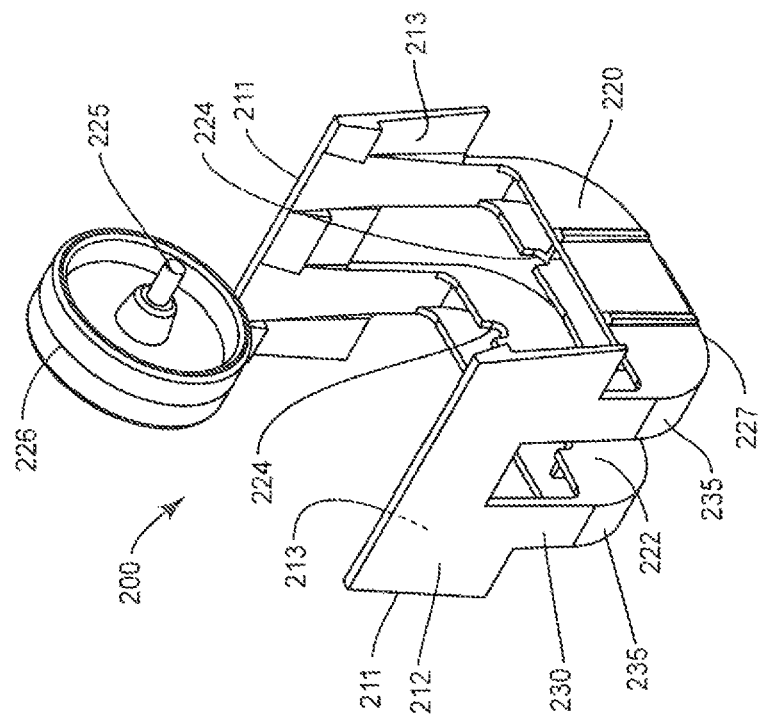
FIG. 19 is an exploded view of the wheel assembly of FIG. 18.
Figure 18:
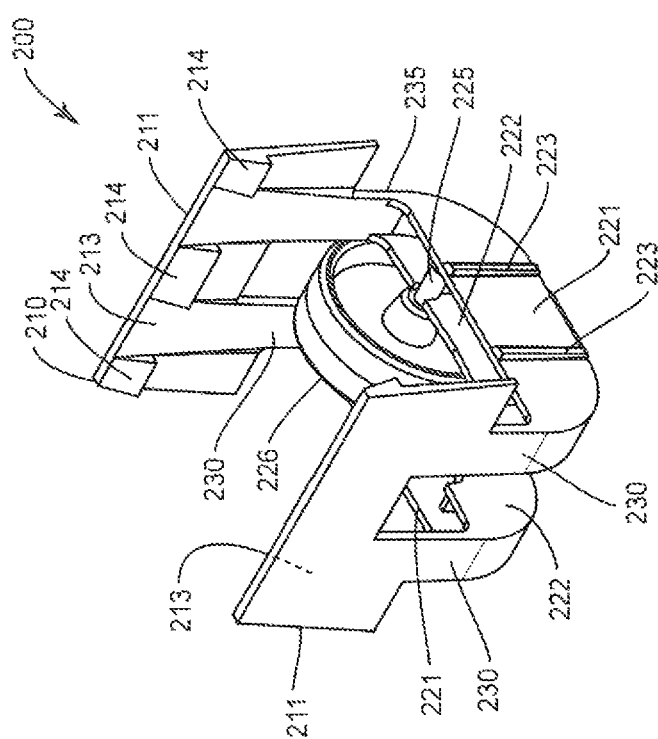
FIG. 18 is a perspective view of a wheel assembly according to one embodiment of the present disclosure.
Figure 20:
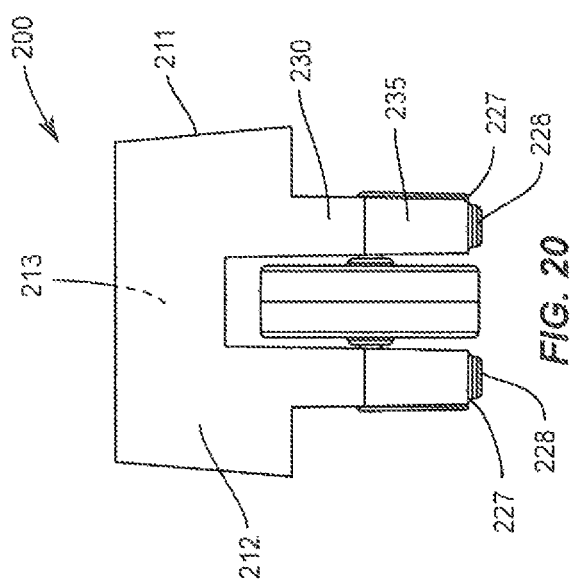
FIG. 20 is a front view of the wheel assembly of FIG. 18.

FIG. 9 is an exploded view of a sign stand with universal legs 100 in a swinging sign panel configuration. FIG. 10 is an assembled sign stand with universal legs 100 in its swinging sign panel configuration. This configuration is using a larger swinging sign panel 901 that utilizes an upper set of protuberances 108.

As shown in FIGS. 12-15, leg 100 can include wheels 1201 positioned along the bottom of base 103 to facilitate easy moving of the assembled stand. The wheels can be removable. In addition, and also not illustrated, leg 100 can include one or more foot pads in addition to or to replace a wheel 1201, and positioned at the bottom of base 103. The foot pad can be of a rubber material to prevent the stand from sliding on a surface.

An easily detachable wheel assembly in accordance with preferred embodiments of the invention is shown generally as a wheel assembly 200 in FIGS. 18-22. Wheel assembly 200 includes a cradle 210 supporting and partially enclosing a wheel 226. Cradle 210 is formed with a well section 220 and a pair of facing attachment plates 211. Attachment plates 211 extend upwards from well section 220 and are joined to well section 220 by flex-members 230. Flex members 230 optionally permit the pair of attachment plates 211 to be resiliently biased apart as wheel assembly 200 is slid onto the bottom of an object, such as a leg of a display structure, such as a sign display stand, similar to the display stands depicted in FIGS. 1-17. Flex members 230 bias (optionally) attachment plates 211 inward, toward each other, to firmly press each attachment plate 211 against the display structure. Nuts, screws and other attachment features can be employed.

Attachment plates 211 each include an outer surface 212 and an inner gripping surfaces 213. Each inner surface 213 includes one or more optional protrusions, such as one or more claw or hook structures 214. Alternatively, attachment plates 211 can include recesses or openings to receive protrusions from the object to which it is to be attached. Attachment plates 211 can also be formed with openings to receive hooks, protrusions, screws or bolts. Hook structures 214 are configured and arranged to engage corresponding surfaces on the display structure, which can be notched or stepped, to removably secure wheel assembly 200 to the display structure, without the need for additional attachment items such as screws, bolts or adhesive. Therefore, the use of such items to secure wheel assembly 200 to the display structure is optional.

Well section 220 includes two outer vertical walls 221 and two inner vertical walls 222. Well section 220 also includes a plurality of end sections 235. Outer walls 221 are provided with a plurality of optional stiffening ribs 223. An upper portion of inner walls 222 are provided with a pair of axle notches 224. An axle 225 of a wheel 226 is supported by axle notches 224 and held in place when wheel assembly 200 is attached to the sign display stand.

Figure 22:
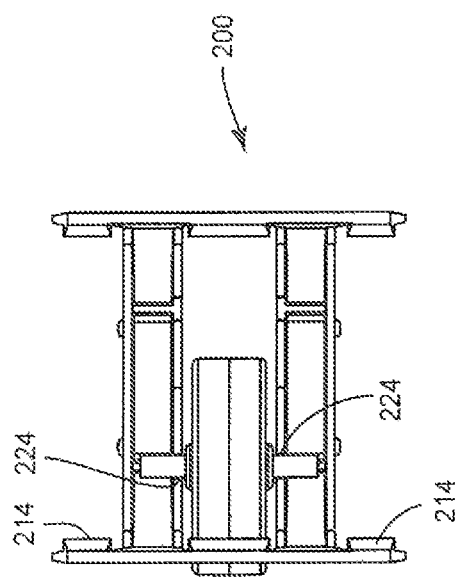
FIG. 22 is a bottom view of the wheel assembly of FIG. 18.
Figure 21:
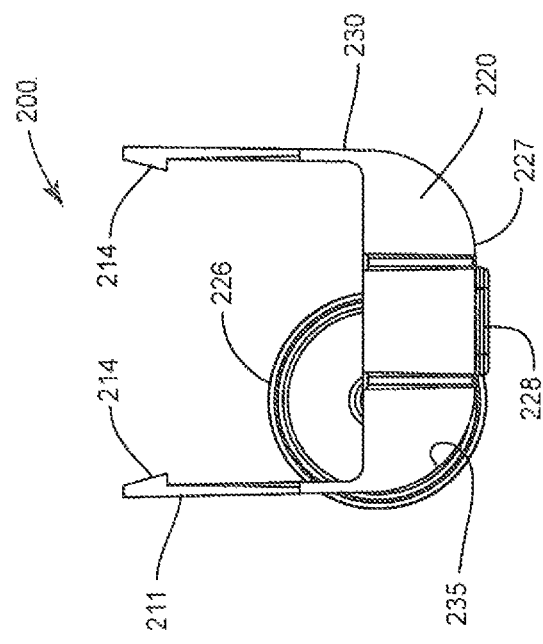
FIG. 21 is a side view of the wheel assembly of FIG. 18.
Figure 23:
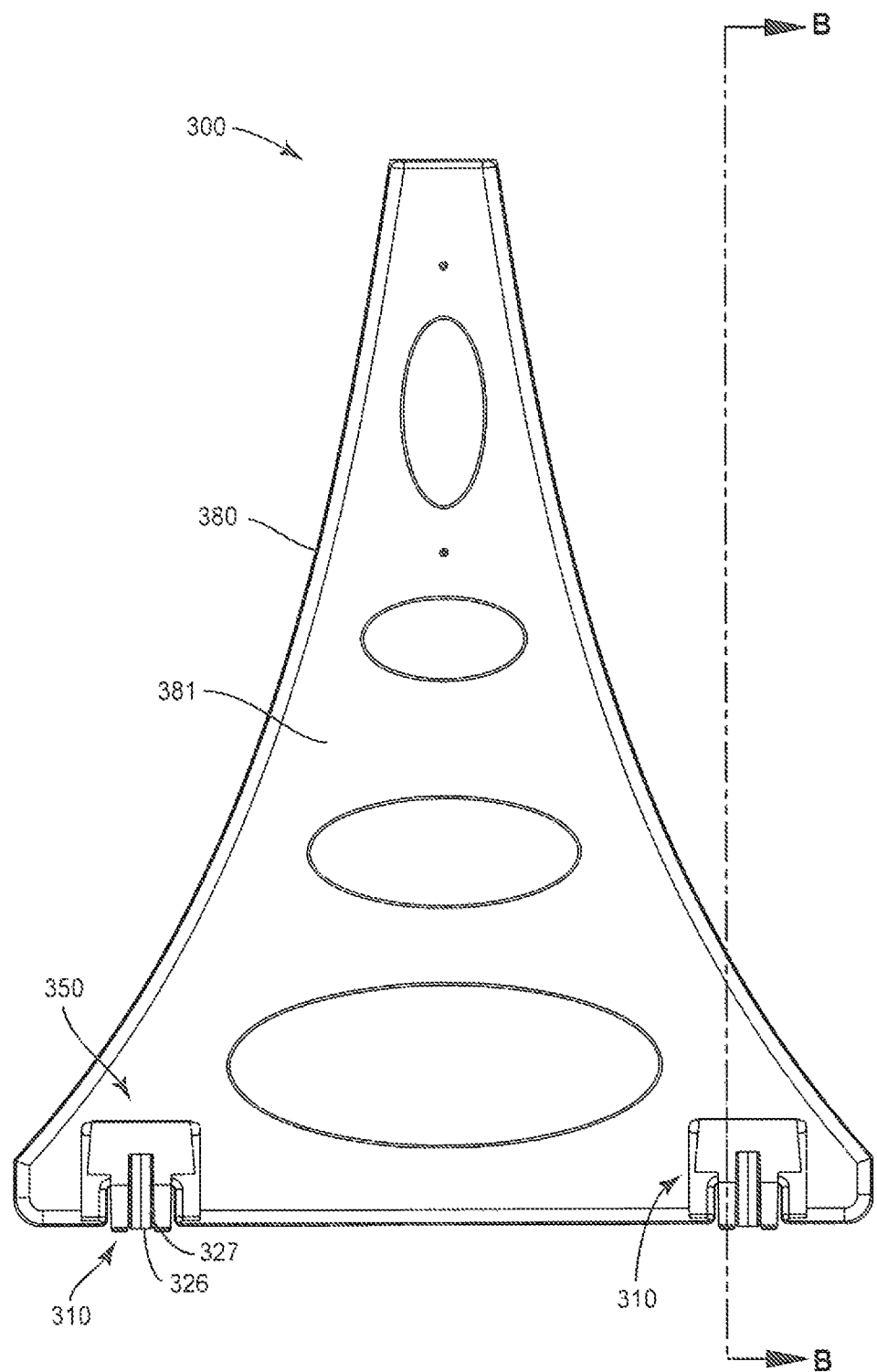
FIG. 23 is a side view of the outside surface of a display stand leg with a wheel assembly according to one embodiment of the present disclosure.
Figure 26:
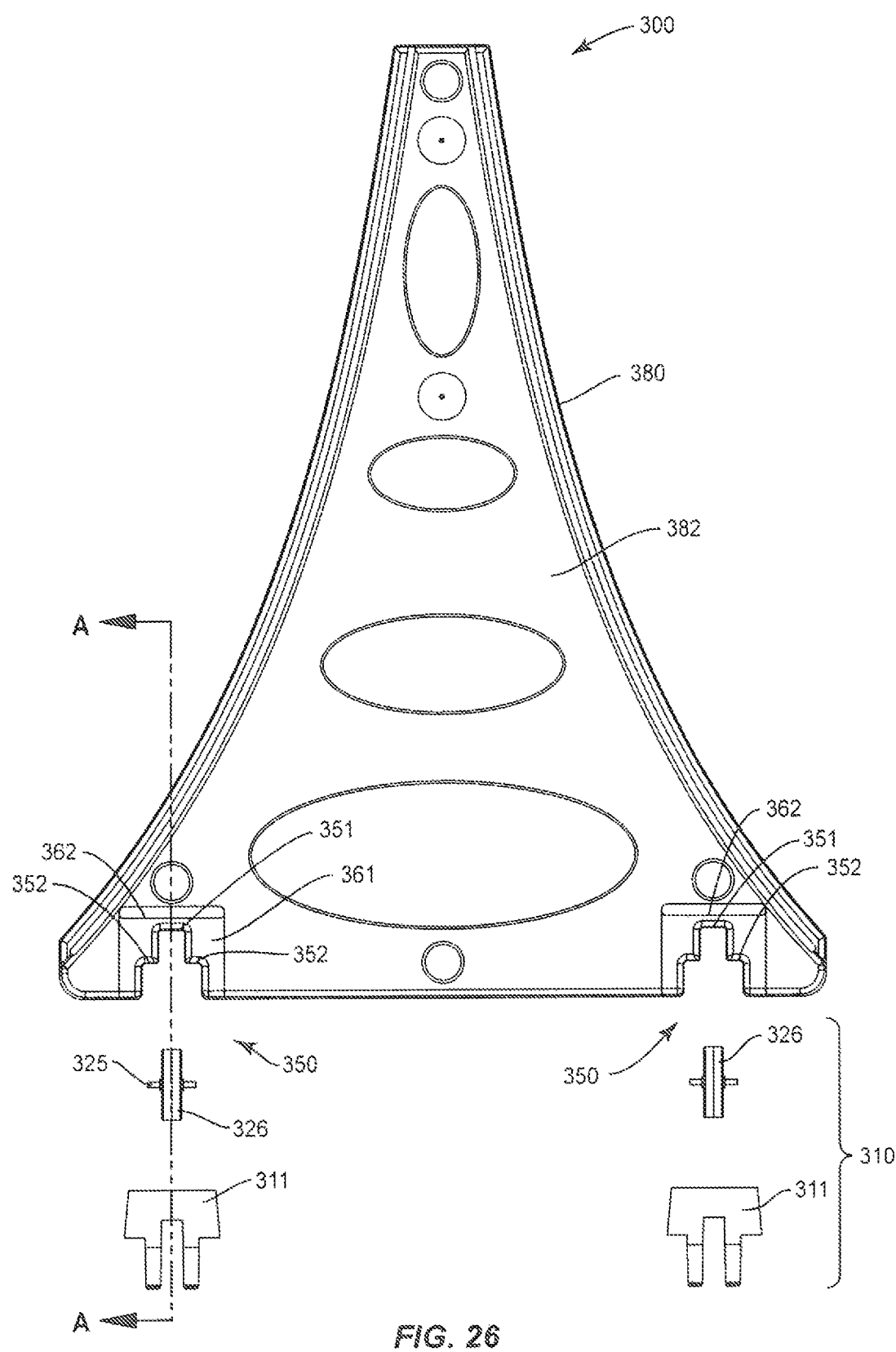
FIG. 26 is an exploded view of the inside surface of the leg and wheel assembly of FIG. 23.
Figure 30:
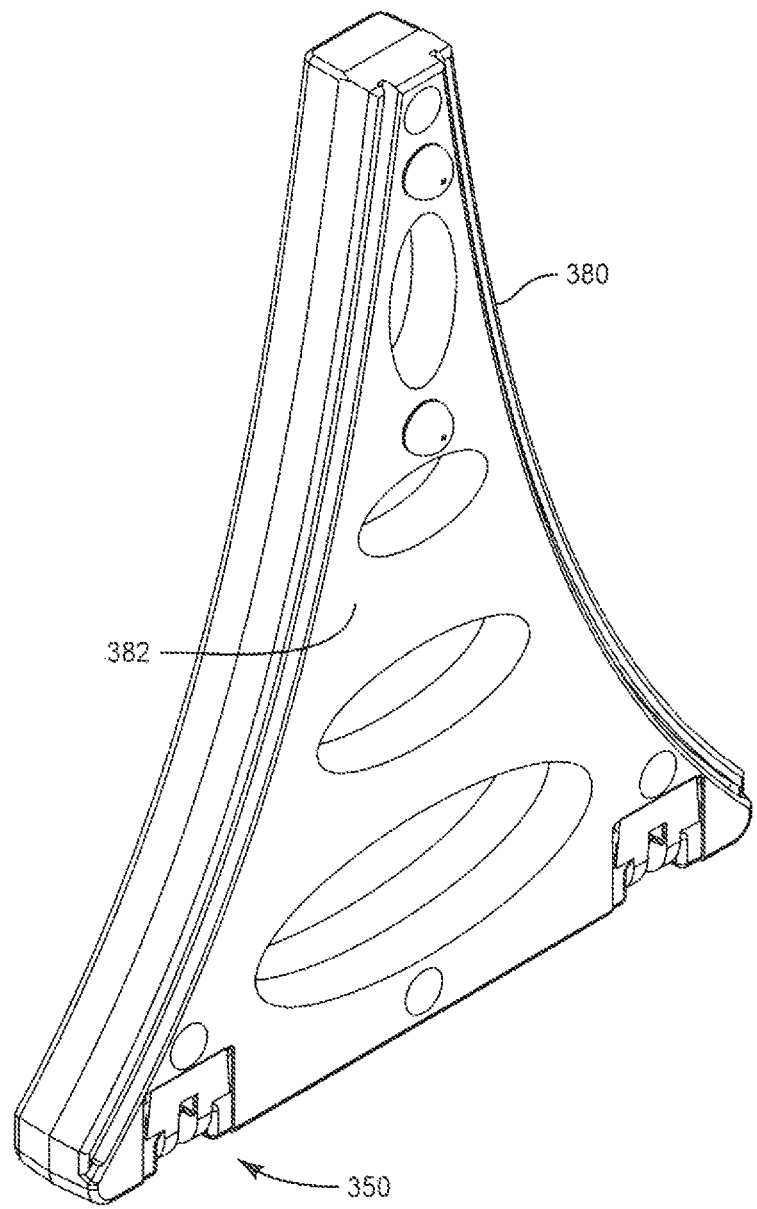
FIG. 30 is a perspective view of the inside surface of the assembly of FIG. 23.
Figure 31:
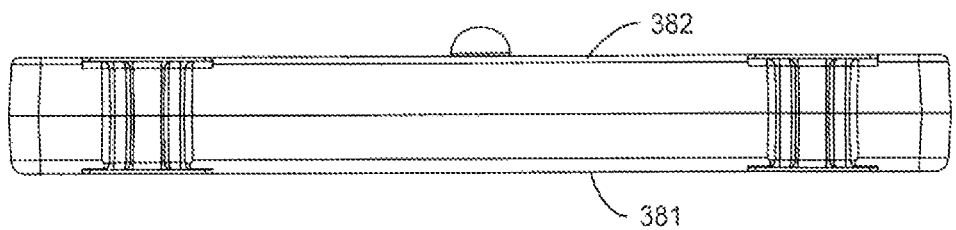
FIG. 31 is a bottom view of the assembly of FIG. 23 without the wheels.
Figure 32A:
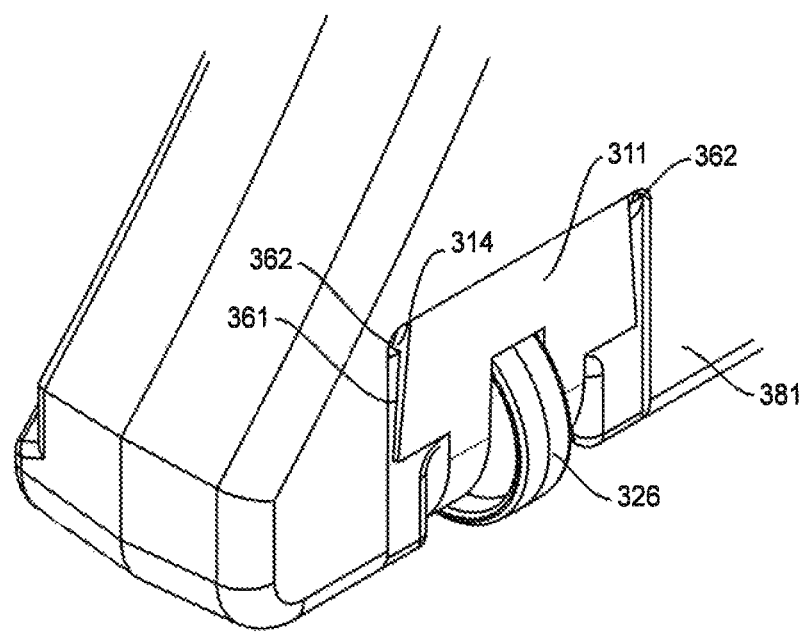
Figure 33:
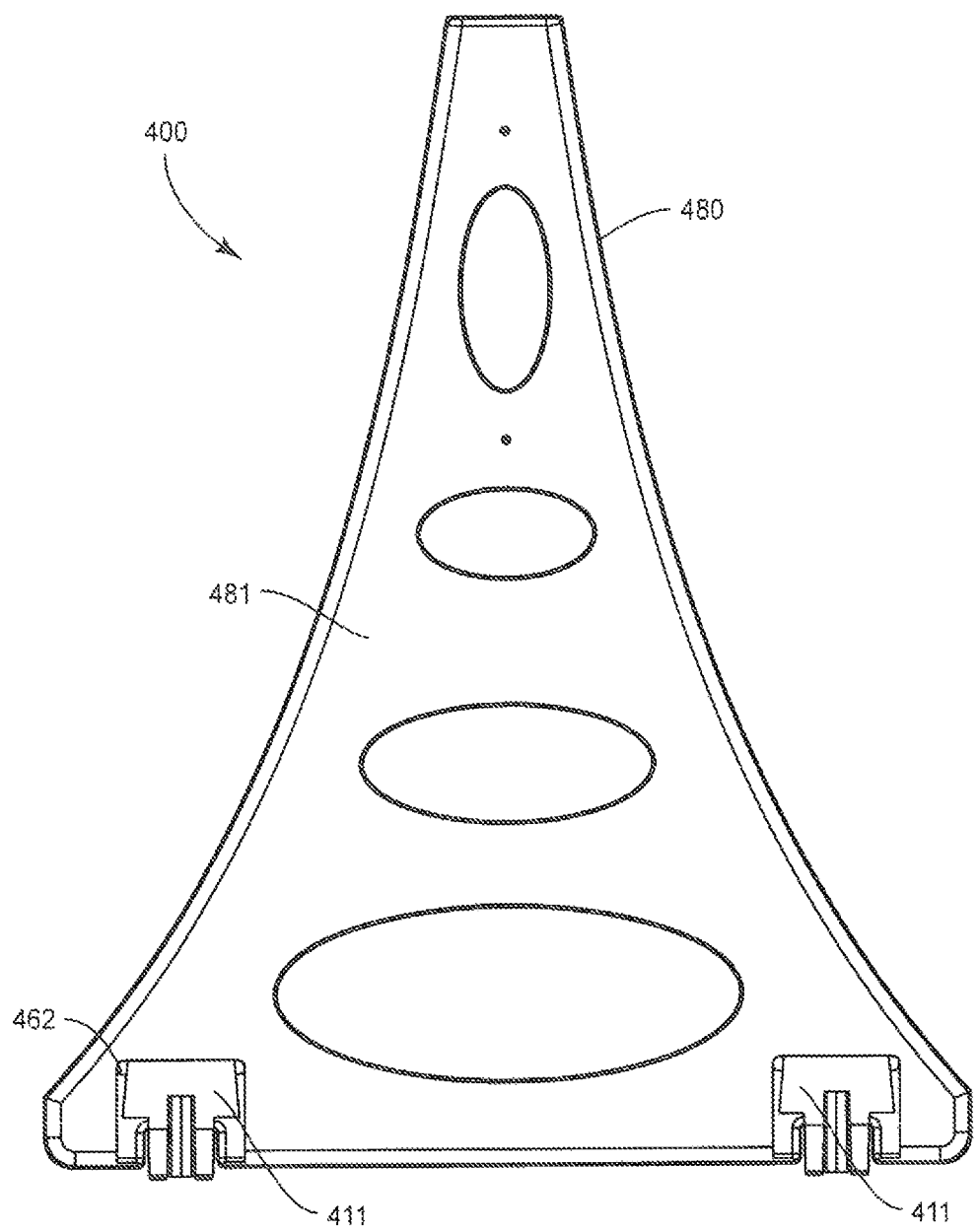
FIG. 33 is a front view of the inside surface of a leg and wheel assembly in accordance with another embodiment of the invention.
Figure 34:
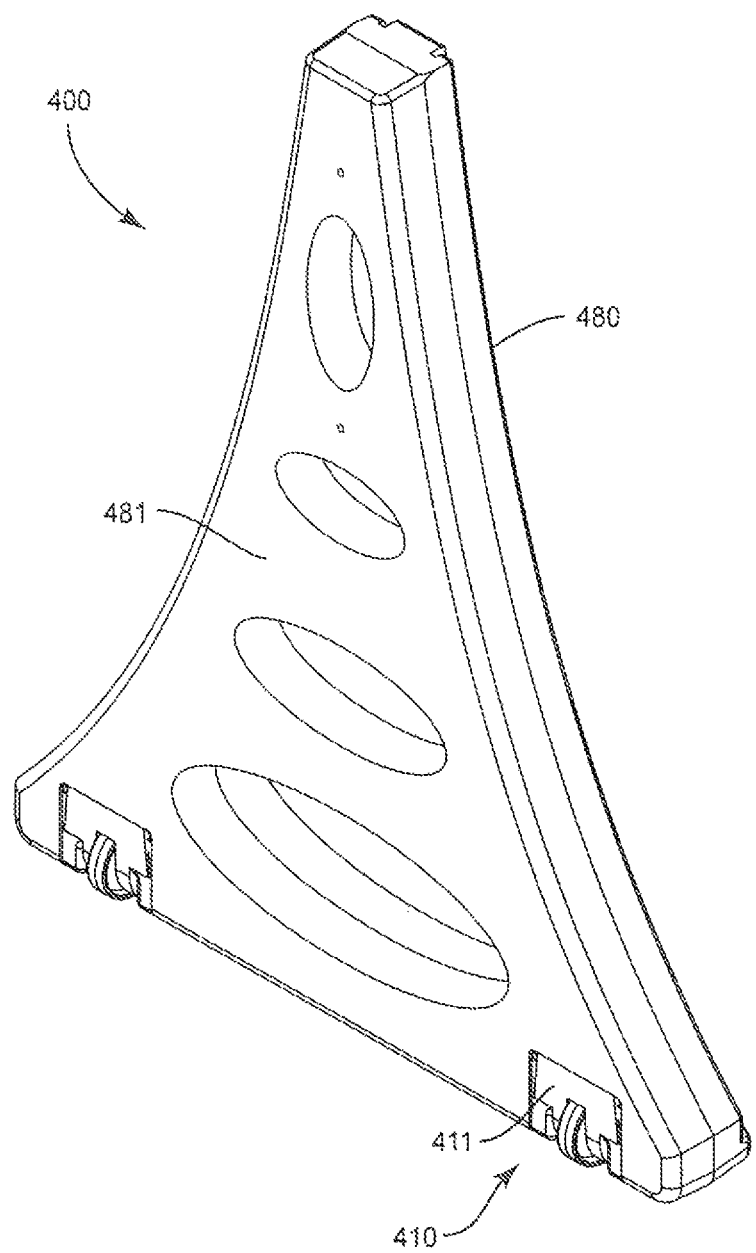
FIG. 34 is a perspective view of the leg and wheel assembly of FIG. 33.
Figure 35:
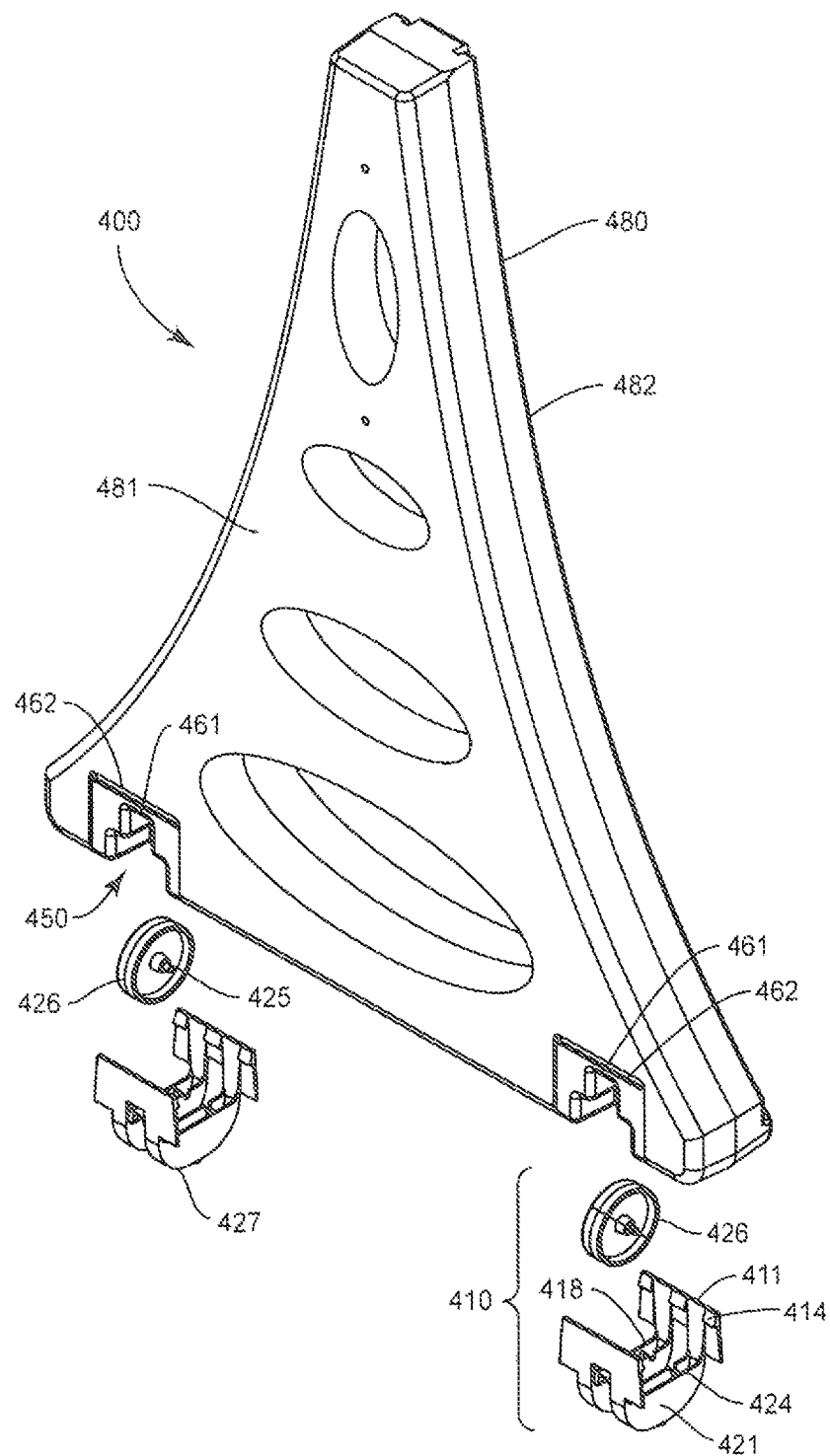
FIG. 35 is an exploded view of the leg and wheel assembly of FIG. 33.
Figure 36:
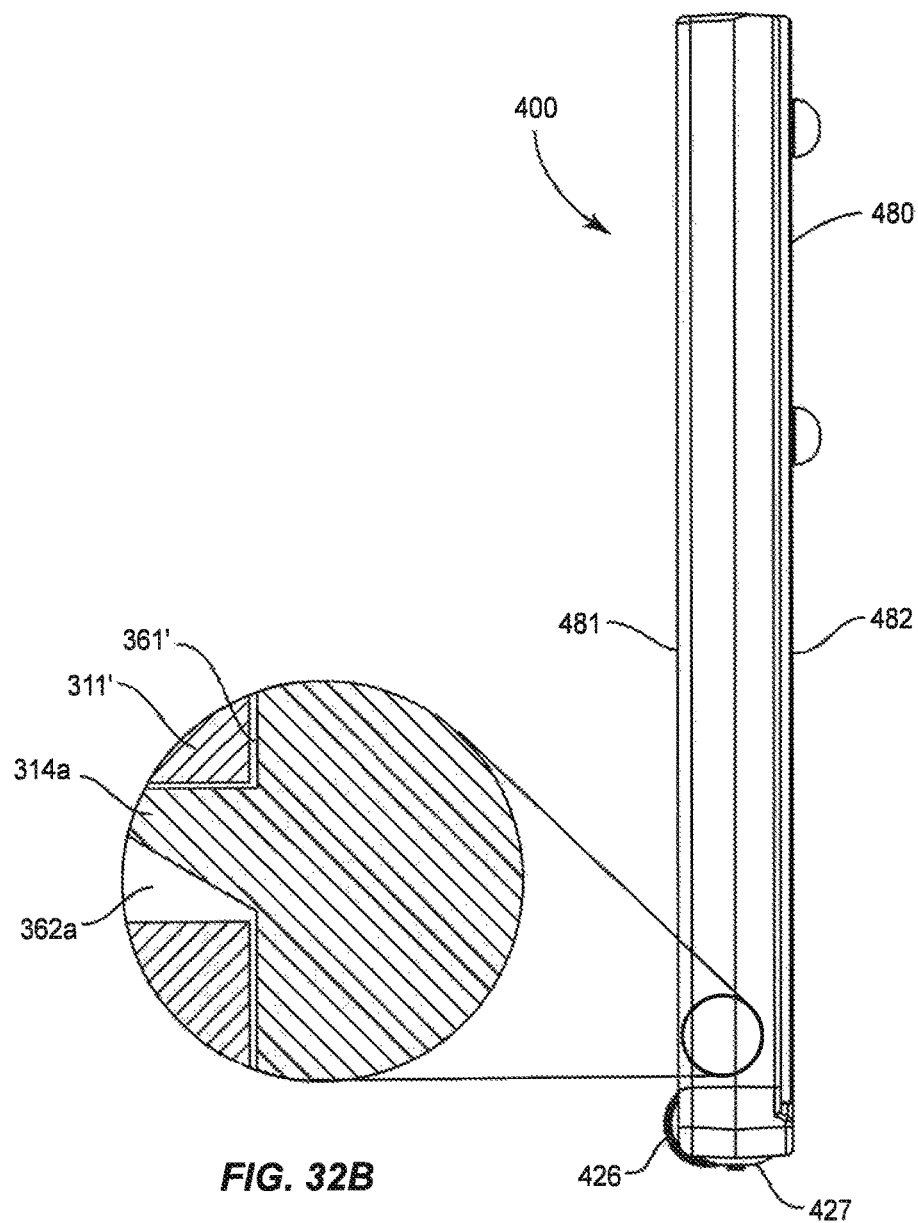
FIG. 36 is a side view of the leg and wheel assembly of FIG. 33.

As shown in FIGS. 21 and 22, well section 220 includes a base portion 227 at the bottom end thereof, which can protect the bottom of the stand from the ground. Base portion 227 includes a plurality of feet 228. Feet 228 are optional, and can be made from rubbery material, selected to prevent the display stand from sliding or durable material, to reduce wear. Feet 228 can take the form or ribs, mounds or other structures to receive wear from the ground. Feet 228 can also be sized to help raise wheel 226 off the ground.

The radius of wheel 226 can be selected to be no more than about the distance from axle notches 224 to the bottom end of cradle 210 (base portion 227 and/or feet 228), so that wheel 226 will not support the display structure in its normal, in use condition. The radius of wheel 226 can also be selected so that wheel 226 does not supportively touch the ground when the display stand is inclined away from the exposed portion of wheel 226. In this inclined configuration, the radius of wheel 226 can be equal to or slightly larger than the distance from axle notches 224 to base portion 227 or feet 228, yet not support the display stand until the exposed portion of wheel 226 is advanced towards the ground. Optionally, the radius of wheel 226 and the dimensions of well 220 and feet 228 can be selected so that wheel 226 is in contact with the ground in the normal in-use condition, with the display stand supported by the ground, floor or other surface.

Axle notches 224 can be positioned a selected distance from end sections 235 of well 220, that is not more than about the radius of wheel 226, so that a portion of wheel 226 extends beyond end sections 235 and is exposed outside cradle 210. Therefore, when the display structure is pivoted about the bottom of cradle portion 210, towards the exposed portion of wheel 226, wheel 226 will contact the ground, floor or other supporting base surface and act as a fulcrum to help lift the bottom end of cradle 230 off the ground and permit the display structure to be wheeled around on wheel (s) 226.

In the preferred embodiment shown in this disclosure, wheel 226 extends in a substantially horizontal direction from cradle 210. In preferred embodiments of the invention, less than half, preferably less than one third or even less than 20% of the wheel is exposed beyond wheel assembly 200. If not enough of the wheel is exposed, it becomes less practical and more sensitive to disruptions and requires too much tipping before the wheels support the display.

A display stand leg and wheel assembly combination, in accordance with preferred embodiments of the invention, is shown generally as a leg-and-wheel assembly 300 in FIGS. 23-27. When fully assembled, in place on the ground, floor or other base surface (see FIG. 41), a display stand in accordance with preferred embodiments of the invention can include a pair of leg and wheel assemblies 300, which are preferably substantially identical and can have similar features, such as grooves and protrusions as leg 100 of FIGS. 1-10.

Leg-and-wheel assembly 300 includes a wheel leg 380 and a pair of wheel assemblies 310 attached (e.g. clipped, bolted or screwed) to the bottom of wheel leg 380. As indicated above, wheel leg 380 corresponds generally to and can contain many of the same features of leg 100, and includes a pair of wheel recesses 350 for receiving wheel assemblies 310. Wheel assembly 310 can correspond generally in structure and contain many of the same features as wheel assembly 200.

Figure 41:
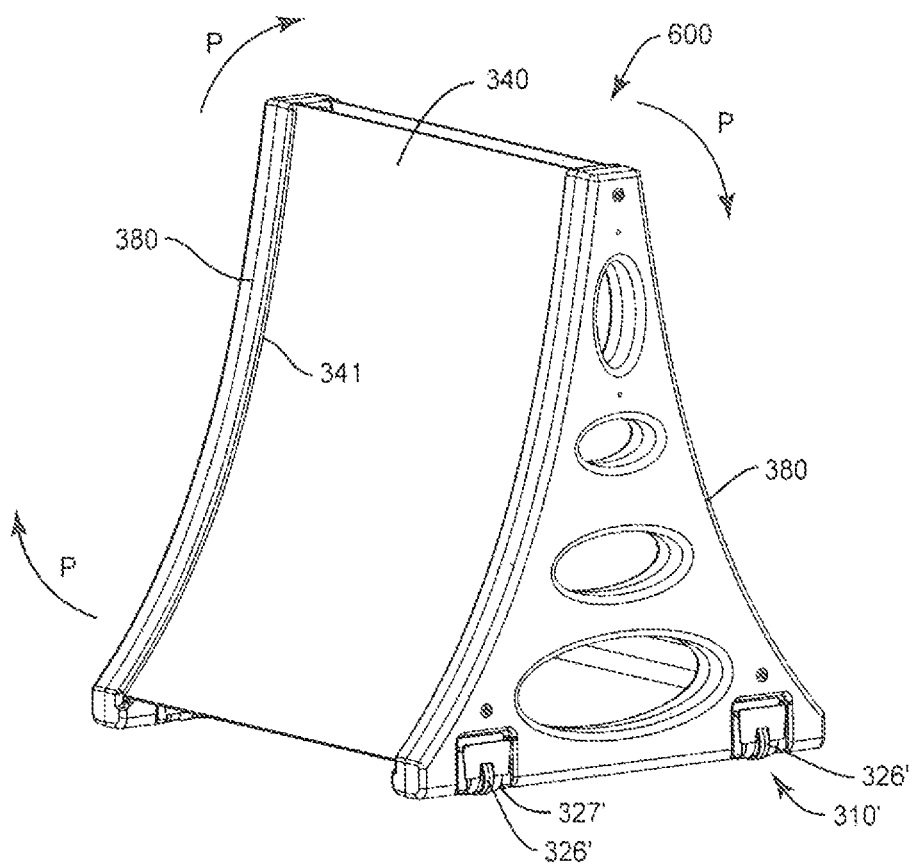
FIG. 41 is a perspective view of a folly assembled display stand including the leg of FIG. 23.
Figure 42:
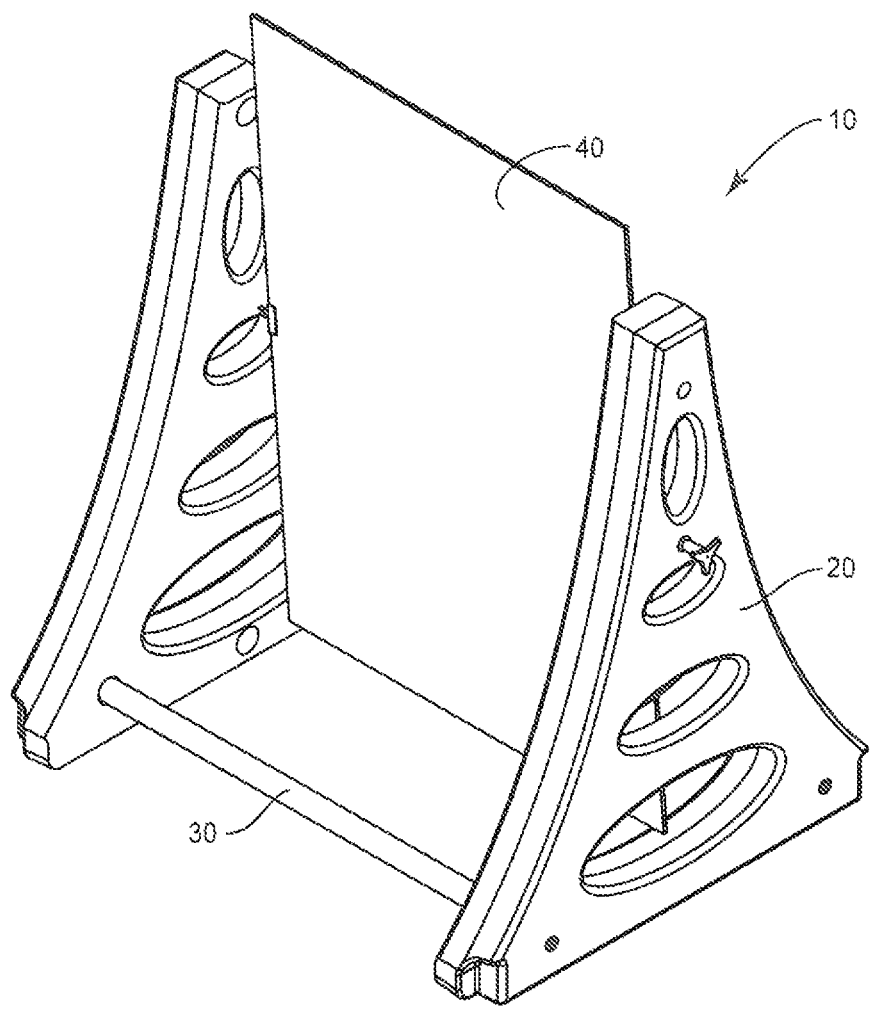
FIG. 42 is a perspective view of a display sign stand in accordance with the prior art.

A fully assembled sign stand 600, including a pair of wheel legs 380 and a sign 340, the edges of which are slid into a pair of channels 341 on legs 380, is shown in FIG. 41. Stand 600 includes four wheel assemblies 310', which can be similar to wheel assemblies 310. As discussed more fully below, stand 600 rests on feet 327' of wheel assembly 310", which can be pads, ribs and the like, to raise leg 380 off the ground and protect it from wear. To move stand 600, it is pivoted about wheels 326' in the direction of an arrow P, to advance the pair of wheels 326' towards the ground and lift feet 327', such that stand 600 is supported by wheels 326'.

Referring again to FIGS. 23-27, wheel leg 380 includes an outer surface 381 and an inner surface 382 and first and second sides connecting inner surface 382 to outer surface 381. When assembled as a display stand or other structure having two corresponding leg and wheel assemblies 300, inner surface 382 will face the corresponding second inner surface 382 of the corresponding leg 380 and the two outer surfaces 381 of the corresponding wheel legs 380 will face in opposite directions. Typically, inner surfaces 382 will be inclined facing the ground in the typical in-use condition and outer surfaces 381 will be inclined facing away from the ground. Optionally, both legs 380 can include wheels 326 in wheel assembly 310 or only one of the legs, with the other leg having a wheel-less foot assembly (not shown).

Wheel recess 350 includes a wheel clearance section slot defined by a top wall 351, sized to provide a wheel 326 with enough clearance below top wall 351 to spin in wheel recess 350. Each wheel recess 350 also includes a pair of downward facing shoulders 352, having inward surfaces facing each other and facing each side of wheel 326. Shoulders 352 face a top portion 328 of a plurality of vertical walls 321 of wheel assembly 350. Wheel 326 includes an axle 325, which is received by a pair of axle notches 324, provided on a pair of top portions 328 of vertical walls 321. Thus, as shown in FIGS. 23-32, axle 325 of wheel 326 is supported by axle notches 324 of top portions 328 and can spin between shoulders 352, beneath top wall 351, within wheel recess 350. Recess 350 should be wide enough to accommodate axle 325 and the bottom surface of shoulders 352 help keep axle 325 in axle notches 324. The surface of shoulders 324 facing axle 325 can be either flat or preferably contoured to the shape of axle 325.

Wheel assembly 310 includes a pair of engagement portions 311, which are spaced apart and face each other. The facing surfaces of engagement portion 311 include a plurality of engagement hooks or claws 314. Engagement portions 311 can also be provided with a variety of other structures, such as protrusions and openings to enhance the grip and strength of the attachment of engagement portion 311 to the surface to which it is attached. Wheel recess 350 can include tongues and/or grooves to receive engagement portion 311 in a tongue and groove configuration. In preferred embodiments of the invention, the wheel assembly can include one or more protrusions that mate with one or more recesses or openings on the object to which the wheel assembly is to be attached. Alternatively, the wheel assembly can include the recess (or opening) and the object the protrusions. Screws, bolts, snaps, rivets and the like are also acceptable.

Wheel recess 350 includes an attachment surface 361 on outer surface 381 and on inner surface 382 for engaging with each of the two engagement portions 311 of wheel assembly 330. Engagement surface 361 is shaped as a recess conforming to the dimensions of engagement portions 311 to provide a flush mounting surface.

Thus, the leg and the wheel assembly can include projections, recesses or openings on the engagement portions to enhance the engagement of the wheel assembly to the leg. For example, there can be projections from the engagement portions received by recesses or openings on the leg engagement surface or recesses or openings in the engagement portions receiving projections from the engagement surfaces. In one embodiment of the invention (FIG. 32A), to attach wheel assembly 310 to leg 380, engagement portions 311 of wheel assembly 310 are resiliently biased apart, and slipped into place against the corresponding attachment surfaces 361 of inner surface 382 and outer surface 381, so that hooks 314 engage corresponding portions of attachment surfaces 361. In one embodiment of the invention, the hooks are claw-like protrusions extending from engagement portions 311 and fit into recesses or notches, such as attachment grooves 362, in attachment surface 361 of wheel leg 380. In another embodiment of the invention (FIG. 32B), the relative position of the hooks and openings are reversed, such that at least one hook 314a extends from an attachment surface 361' and fits into a recess or opening 362a, formed in an engagement portion 311'. Note that, engagement portions 311 need not be biased together and need not provide a clamping force. Engagement portions 311 can optionally be held in place by or with the supplemental assistance of bolts or screws and can include openings to receive the bolts or screws.

As with wheel assembly 200, the radius of wheel 326 can be selected to be less than about the distance from axle notches 324 to the bottom of a base 32 at the lower end of leg and wheel assembly 300, so that wheel 326 is not in supportive contact with the ground when the display structure is in its normal, in-use condition. Optionally, the radius of wheel 326 and the dimensions of cradle 311 can be selected so that wheel 326 is in supportive contact with the ground in the normal in-use condition. For example, the radius of wheel 326 can match the distance from wheel notches 324 to the bottom of base 327, so that wheel 326 supportively contacts the ground when wheel leg 380 is vertical, but not inclined with wheel 326 facing away from the ground. Base 327 can include added feet or a thickened rib(s) to assist with wear resistance of wheel assembly 310.

Wheel 326 preferably extends from a side 335 of wheel assemble 310. To move an assembled display stand in accordance with preferred embodiments of the invention and utilize the wheel feature, the assembled device is pivoted, using the pair of wheel assemblies 310 as a fulcrum, so that outer surface 381 is advanced towards the ground or other supporting surface. As outer surface 381 moves towards the ground, the pair of wheels 326 come into contact with the ground and bottom portion 327 is lifted to permit the assembled stand to be rolled on wheels 326.

A wheel and leg assembly having a smaller recess to receive the wheel assembly and having more of the wheel assembly extending from the bottom thereof, is shown generally as a raised wheel and leg assembly 400 in FIGS. 33-36. Raised wheel and leg assembly 400 includes a raised leg 480 and an extending wheel assembly 410. Raised leg 480 has an outer surface 481 and an inner surface 482. Raised leg 480 includes a pair of wheel recesses 450 having a top wall 451 to define a slot for receiving a wheel 426 of extending wheel assembly 410. Each wheel recess 450 includes an attachment surface 461 to which wheel assembly 410 can be attached.

Extending wheel assembly 410 corresponds generally to and can be identical to wheel assembly 310. Wheel 426 has an axle 425. Extending wheel assembly 410 also includes a cradle portion 421. Cradle 421 also includes one or more pairs of axle notches 424 for receiving an axle 425 of wheel 426. Wheel assembly 410 also includes a pair of attachment plates 411 extending upwards from cradle 421.

Attachment surfaces 461 can be recesses conforming to the dimensions of attachment plates 411, to provide a flush mounting surface. Attachment surface 461 can include an engagement notch 462 to receive one or more protrusions 414 from attachment plate 411. Attachment plates 411 are optionally resiliency biased towards each other, to provide a clamping force and help hold wheel assembly 410 to leg 480. One or more hooks 414 or other structures can help hold wheel assembly 410 to leg 480. Optionally, attachment plates 411 can include holes or recesses to receive hooks, claws or other protrusions from leg 480. Wheel assembly 410 can also be held to leg 480 with the use of screws or bolts instead of, or to supplement the other attachment structures.

To assemble extended wheel and leg assembly 400, wheel 426 is placed in cradle 421 with axle 425 in axle notches 424. Optionally, only the wheel assemblies 400 of one of the legs will include wheels. Wheel assembly 410 is then slipped in place, with attachment plates 411 against engagement surfaces 461. The bottom portion of wheel assembly 410 (with or without a wheel) will extend downward from leg 480. Ordinarily, but not exclusively, wheel 426 will not supportively touch the ground in the normal in-use configuration. To move wheel and leg assembly 400, the top of leg 480 is pivoted in the direction of outer surface 482 until wheels 426 contact the ground and acts as a fulcrum to lift the remainder of wheel assembly 411 off the ground so that the stand can be moved with wheels 426. In one embodiment of the invention, the wheel can be omitted and a wheel-less extending wheel assembly 410 will act at a protective base for leg 480, to replaceably protect leg 480 from wear and tear.

Figure 37:
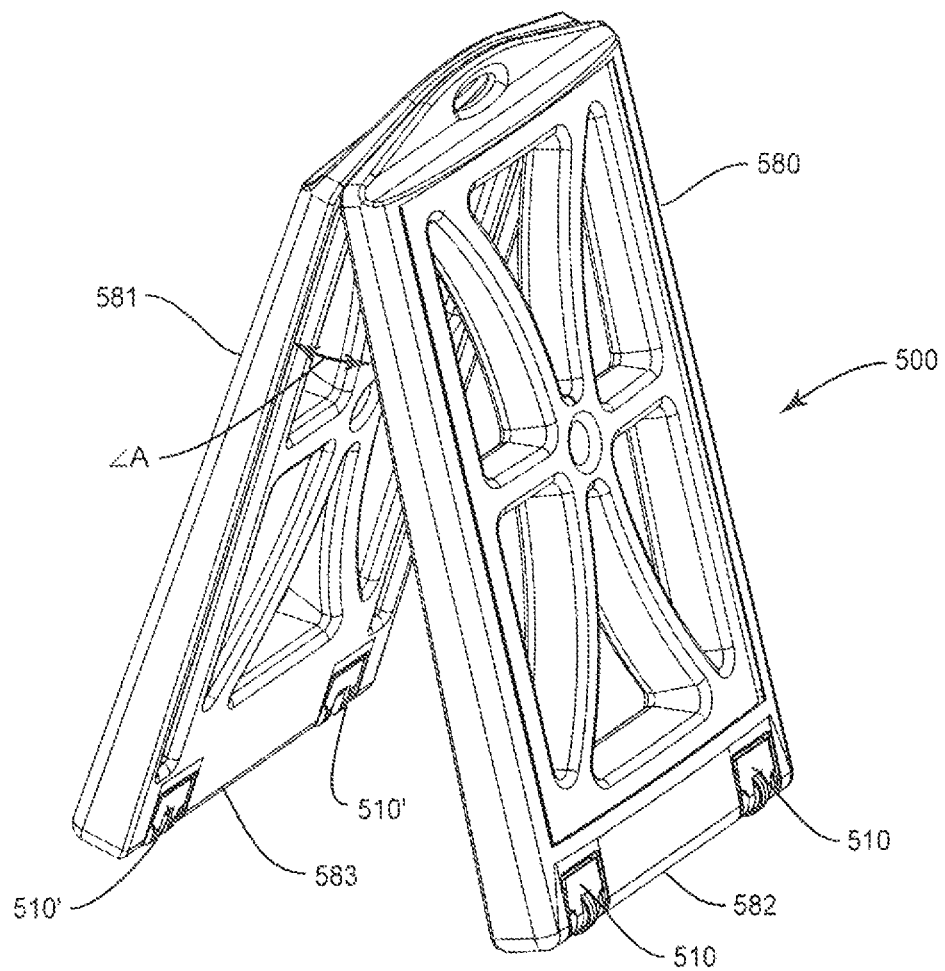
FIG. 37 is a perspective view of an A-frame display stand having a wheel assembly having two flat sections, in the expanded in-use condition, in accordance with another embodiment of the invention.
Figure 38:
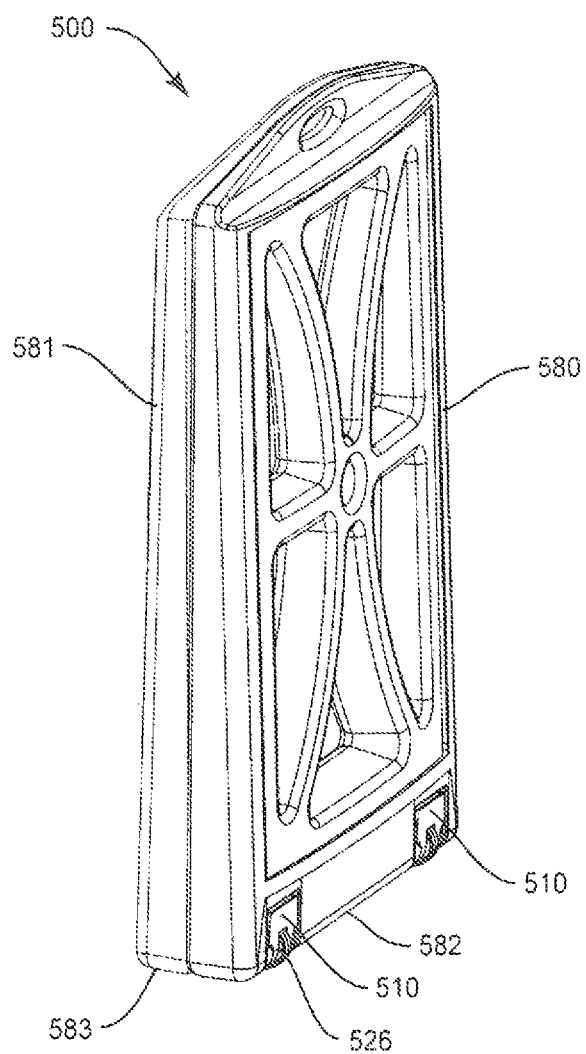
FIG. 38 is a perspective view of the stand of FIG. 37, in the collapsed travel condition.

An A-frame shaped display stand having a dual-flat surface wheel assembly, in accordance with another preferred embodiments of the invention, is shown as an A-frame stand 500 in FIGS. 37-40. In FIG. 37, A-frame stand 500 is shown in its expanded, in-use condition. Referring to FIG. 38, A-frame stand 500 is shown in the collapsed, transportation condition.

A-frame stand 500 includes a pair of A-frame legs 580 and 581. An angle A is the angle at the apex between leg 580 and leg 581. When in the expanded, in-use condition, A-frame legs 580 and 581 are inclined to the ground and a base 582 and 583 of legs 580 and 581, respectively, are also inclined to the ground. If bases 582 and 583 are perpendicular to the longitudinal axis of legs 580 and 581, respectively, the angle of the base of legs 580 and 581 to the ground will be ½ angle A. In the collapsed transportation condition, bases 582 and 583 are substantially parallel to the ground.

A pair of dual-surface wheel assemblies 510, including wheels 526, are provided at base 582 of A-frame leg 580. A pair of dual-surface wheel assemblies 510' are provided on base 583 of A-frame leg 581. Wheel assemblies 510' are identical to wheel assemblies 510, but do not include wheels 526 as one embodiment of the invention.

Dual flat wheel assembly 510 is similar to wheel assembly 310, and includes a pair of engagement portions 513, which are spaced apart and face each other. The facing surfaces of engagement portions 511 include a plurality of hooks or claws 514. Engagement portion 511 can also be provided with a variety of other structures, such as openings or protrusions, to enhance the attachment of engagement portion 511 to the surface to which it is attached. The bottom portion of legs 580 and 581 can include similar structures as leg 380 or leg 480, for receiving wheel assembly 510.

Figure 39:
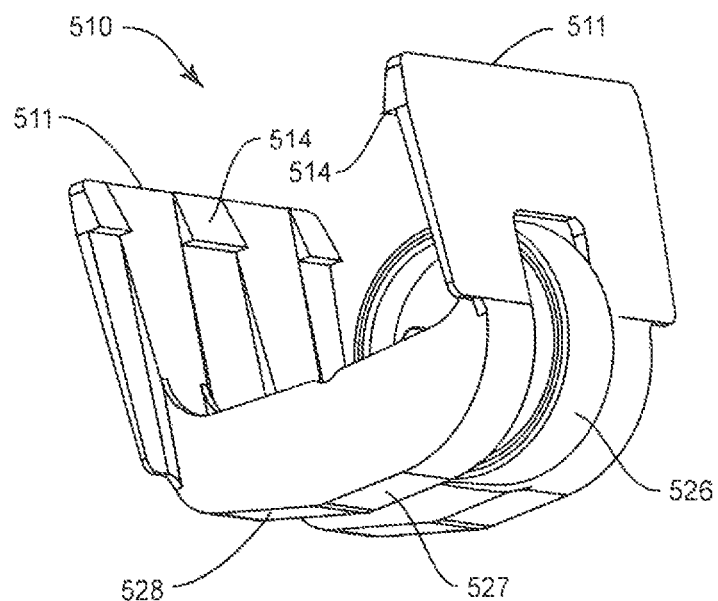
FIG. 39 is a perspective view of the wheel assembly the stand of FIG. 37.
Figure 40:
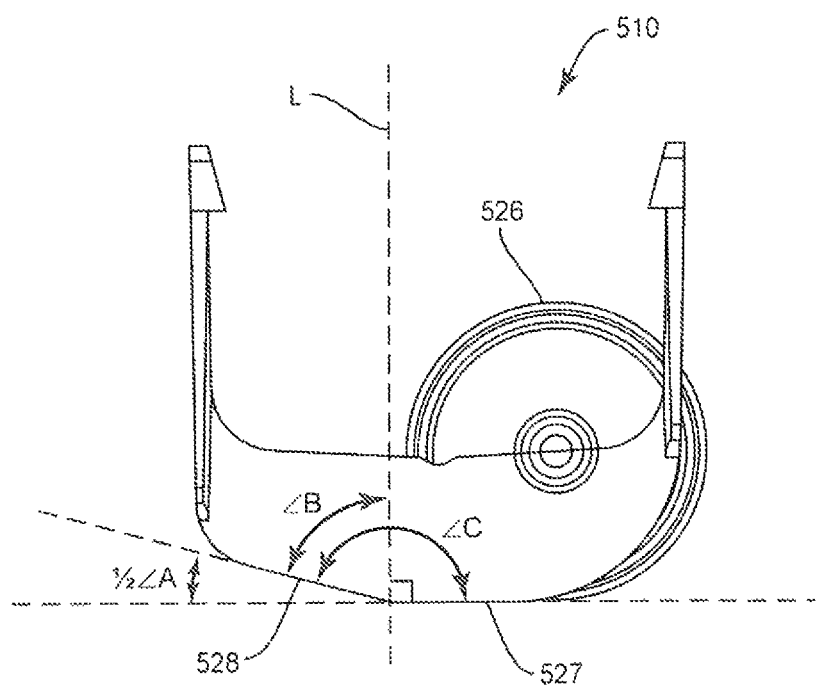
FIG. 40 is another perspective view of the wheel assembly of the stand of FIG. 37.

Referring to FIGS. 39 and 40, dual-flat wheel assembly 530 includes a first flat portion 527 and a second, flat portion 528. First flat portion 527 defines a plane that is preferably at an obtuse angle to a plane defined by second flat portion 528 (or at an acute angle to the extension of this plane) and is preferably closer to wheel 526 than is second flat portion 528. Optionally, either first or second flat portion 527 or 528 can include a supplemental foot portion or rib, such as one similar to foot 228. First flat portion 527 is configured so that when A-frame display stand 500 is in the collapsed, transportation condition, first flat portion 527 will be perpendicular to longitudinal axis L of leg 580 (and leg 581). If collapsed A-frame display stand 500 is positioned vertically, longitudinal axis L of legs 580 and 581 will be perpendicular to the ground and first flat portion 527 will be parallel to the ground. Accordingly, collapsed A-frame 500 can stand in place, with first flat portion 527 substantially parallel to the ground. Likewise, if stand 600 with legs 380, shown in FIG. 41 is used with assembly 510, the longitudinal axis of leg 380 will be perpendicular to the ground and the stand can be supported by first flat portion 527 and any foot or rib or other structure thereon.

Second flat portion 528 is configured so that in the expanded, in-use condition, second flat portion 528 will be parallel to the ground. Therefore, if second flat portion 528 defines a plane that is ½ angle A to the extended plane defined by first flat portion 527, second flat, portion 527 will be parallel to the ground when A-frame 500 is in the expanded condition.

Referring to FIG. 40, in the spread, in-use condition, base 582 of leg 580 will define a plane inclined to the ground at an angle of about half the angle of apex angle A between legs 580 and 581. Therefore, second flat portion 528 will preferably define a plane at an acute angle B to longitudinal axis L of leg 580. In a preferred embodiment of the invention, leg 580 is at angle A to leg 581 (FIG. 37). It is therefore at an angle of ½ angle A to perpendicular axis (plumb line) L to the ground. Accordingly, second flat portion 528 preferably defines a plane at an angle of 90° minus (½ angle A) to the longitudinal axis of leg 580, whereby it will be parallel to the ground in the in-use condition.

In preferred embodiments of the invention, angle A is 46° to 10°, more preferably 40° to 20°. Therefore, half angle A is 23° to 5°, preferably 20° to 10°. First flat portion 527 will be approximately perpendicular, within acceptable tolerances, to longitudinal axis L of leg 580 and second flat portion 528 will define a plane at an angle 23° to 5°, preferably 20° to 10° to the plane defined by first flat portion 527. This will be at an angle B of about 85°-67°, more preferably about 80°-70° to the longitudinal axis of leg 580. Because first flat portion 527 will be at an angle of about 90° to longitudinal axis L, first flat portion 527 can also be considered to define a plane at an angle C of about 175°-157°, more preferably, 170°-160° to second flat portion 528.

In this manner, dual-flat wheel assembly 510 provides a flat resting surface for both the in-use expanded condition and collapsed, transportation condition. A-frame stand 500 can optionally be provided with two sets of wheels 526 or one set of wheels 526. However, in either embodiment of the invention, the legs of stand 500 are protected.

Components of the system can be fabricated from materials suitable for display stand applications, including, but not limited to, metal(s), plastic(s), wood(s), combinations thereof, etc. Various components of the system may be fabricated from material composites, including the above materials, to achieve various desired characteristics such as strength, rigidity, elasticity, flexibility, compliance, performance, and durability. The components of the system, individually or collectively, may also be fabricated from a heterogeneous material such as a combination of two or more of the above-described materials.

Where this application has listed the steps of a method or procedure in a specific order, it may be possible, or even expedient in certain circumstances, to change the order in which some steps are performed, and if is intended that the particular steps of the method or procedure claim set forth herebelow not be construed as being order-specific unless such order specificity is expressly stated in the claims.

While the preferred embodiments of the devices and methods have been described in reference to the environment in which they were developed, they are merely illustrative of the principles of the inventions. Modification or combinations of the above-described assemblies, other embodiments, configurations, and methods for carrying out the invention, and variations of aspects of the invention that are obvious to those of skill in the art are intended to be within the scope of the claims.

What is claimed is:

1. A leg and wheel assembly combination for a display stand on a support surface, the leg and wheel assembly combination comprising:

a leg having a first side defining an inner surface, a second side defining an outer surface, a base defining a bottom surface, and a top end opposite the base, the leg formed with structures configured and adapted to support a sign;

at least one wheel assembly attached to the base and extending below the bottom surface, the at least one wheel assembly comprising a cradle having a bottom portion and defining a downward direction from the base of the leg toward the bottom portion of the cradle and an upward direction opposite the downward direction, the bottom portion of the cradle adapted to contact the support surface, the cradle including a first attachment member extending in the upward direction and a second attachment member extending in the upward direction, the at least one wheel assembly further comprising a wheel having an axle supported and partially enclosed by the cradle, wherein a portion of the wheel extends outside the cradle in a direction substantially perpendicular to the downward direction, the base of the leg includes at least one wheel assembly recess having a wide gap portion and a narrow gap portion having a width smaller than a width of the wide gap portion, the narrow gap portion is located upward from the wide gap portion, the cradle is received in the wide gap portion, a portion of the wheel upward from the axle is positioned in the narrow gap portion, and substantially all of the cradle is located upward from the bottom surface;

the first attachment member is releasably attached to a first engagement surface portion of the outer surface of the leg and the second attachment member is releasably attached to a second engagement surface portion of the inner surface of the leg.

2. The leg and wheel assembly combination of claim 1, wherein the at least one wheel assembly is a first wheel assembly, and wherein the leg and wheel assembly combination further comprises a second wheel assembly releasably attached to the base of the leg, and wherein the second wheel assembly has an identical construction as the first wheel assembly.

3. An apparatus comprising two of the leg and wheel assembly combinations of claim 2.

4. The leg and wheel assembly combination of claim 1, further comprising projections, recesses, or openings on the first and second attachment members to enhance the attachment of the first and second attachment members to the leg.

5. The leg and wheel assembly combination of claim 1, wherein the first and second attachment members are resiliently biased toward each other.

6. The leg and wheel assembly combination of claim 1, wherein a plurality of projections extending from the first and second attachment members are received by recesses or openings in the first and second engagement surface portions, or wherein openings in the first and second attachment members receive projections extending from the first and second engagement surface portions.

7. The leg and wheel assembly combination of claim 1, wherein the first and second engagement surface portions are configured as respective first and second recesses in the leg and have dimensions to receive the first and second attachment members.

8. The leg and wheel assembly combination of claim 1, wherein the narrow gap portion has dimensions to permit the wheel to spin therein, and wherein the axle is positioned below the narrow gap portion.

9. The leg and wheel assembly combination of claim 1, wherein, when the leg and wheel assembly combination is in a display position, the cradle is configured to be in contact with the support surface, and wherein, when the leg and wheel assembly combination is in a rolling position, the leg is configured to be tilted relative to the support surface and the wheel is configured to come into supportive contact with the support surface to lift the cradle off the support surface.

10. The leg and wheel assembly combination of claim 1, wherein each of the first attachment member and the second attachment member comprises an attachment means for releasably attaching the at least one wheel assembly to the leg.

11. A method of moving a sign display stand, the sign display stand including the leg and wheel assembly combination of claim 1, the cradle resting on a support surface with the wheel spaced apart from the support surface, the method comprising the steps of:

tilting the sign display stand until the wheel contacts the support surface and acts as a fulcrum to lift the cradle off the support surface; and rolling the sign display stand on the wheel.

12. A leg and wheel assembly combination for a display stand on a support surface, the leg and wheel assembly combination comprising:

a leg having a first side defining an inner surface, a second side defining an outer surface, a base defining a bottom surface, and a top end opposite the base, the leg formed with structures configured and adapted to support a sign;

at least one wheel assembly releasably attached to the base and partially extending below the bottom surface, the at least one wheel assembly comprising a cradle having a bottom portion and defining a downward direction from the base of the leg toward the bottom portion of the cradle and an upward direction opposite the downward direction, the bottom portion of the cradle adapted to contact the support surface, the cradle including a first attachment member extending in the upward direction and a second attachment member extending in the upward direction, the at least one wheel assembly further comprising a wheel having an axle supported and partially enclosed by the cradle;

a portion of the wheel extends outside the cradle in a direction substantially perpendicular to the downward direction and is positioned above the bottom portion of the cradle in the upward direction, substantially the entire wheel is positioned upward from the bottom surface of the base of the leg, wherein the cradle and the wheel are positioned and configured so that when the cradle is placed on the support surface, the wheel will not support the leg unless the leg is sufficiently inclined toward the support surface by a selected amount to pivot the wheel downward to place the wheel in supportive contact with the support surface.

13. The leg and wheel assembly combination of claim 12, wherein less than one third of the wheel is exposed outside the cradle.

14. The leg and wheel assembly combination of claim 12, wherein less than 20% of the wheel is exposed outside the cradle.

15. A leg and wheel assembly combination for a display stand on a support surface, the leg and wheel assembly combination comprising:

a leg having a first side defining an inner surface, a second side defining an outer surface, a base defining a bottom surface, and a top end opposite the base, the leg formed with structures configured and adapted to support a sign;

at least one wheel assembly releasably attached to the base and partially extending below the bottom surface, the at least one wheel assembly comprising a cradle having a bottom portion and defining a downward direction from the base of the leg toward the bottom portion of the cradle and an upward direction opposite the downward direction, the bottom portion of the cradle adapted to contact the support surface, the cradle including a first attachment member extending in the upward direction and a second attachment member extending in the upward direction, the at least one wheel assembly further comprising a wheel having an axle supported and partially enclosed by the cradle;

the base of the leg includes at least one wheel recess and a cradle recess downward from the at least one wheel recess, the at least one wheel recess having dimensions to permit the wheel to spin therein, and the cradle recess sized to receive the cradle;

a top portion of the wheel upward from the axle is positioned in the at least one wheel recess;

substantially all lower portions of the cradle, arranged below the first and second attachment members, are positioned in the cradle recess; and substantially the entire wheel is positioned upward from the bottom surface of the base of the leg.

16. The leg and wheel assembly combination of claim 15, wherein the bottom portion of the cradle includes a first flat portion defining a first plane perpendicular to a longitudinal axis of the leg and a second flat portion defining a second plane at an angle of about 5°-23° with respect to the first plane.

* * * * *